United States Patent [19]

Foley

[11] Patent Number: 5,249,120
[45] Date of Patent: Sep. 28, 1993

[54] AUTOMATED MANUFACTURING COSTING SYSTEM AND METHOD

[75] Inventor: Michael Foley, Cambridge, Mass.

[73] Assignee: The Charles Stark Draper Laboratory, Inc., Cambridge, Mass.

[21] Appl. No.: 641,161

[22] Filed: Jan. 14, 1991

[51] Int. Cl.⁵ .................. G06F 15/46; G06F 15/20
[52] U.S. Cl. .................. 364/401; 364/402; 364/464.01; 364/468; 364/156
[58] Field of Search ............ 364/401, 402, 403, 406, 364/468, 478, 464.01, 148, 156

[56] References Cited

U.S. PATENT DOCUMENTS

| | | | |
|---|---|---|---|
| 4,744,028 | 5/1988 | Karmarkar | 364/402 |
| 4,847,761 | 7/1989 | Ferriter et al. | 364/403 |
| 4,887,207 | 12/1989 | Natarajan | 364/401 |
| 4,887,218 | 12/1989 | Natarajan | 364/403 |
| 4,905,144 | 2/1990 | Hansen | 364/148 |
| 4,931,944 | 6/1990 | Richter et al. | 364/468 |
| 5,058,026 | 10/1991 | Kunii et al. | 364/468 |
| 5,063,506 | 11/1991 | Brockwell et al. | 364/401 |
| 5,109,337 | 4/1992 | Ferriter et al. | 364/401 |
| 5,140,526 | 8/1992 | McDermith et al. | 364/402 |

OTHER PUBLICATIONS

Foley et al., "Computer-based Manufacturing Cost Analysis for the Fabrication of Thermoplastic Composite Structures", Jan. 15-18, 1990, 32 pages.

Primary Examiner—Robert A. Weinhardt
Assistant Examiner—Jennifer L. Hazard
Attorney, Agent, or Firm—Iandiorio & Dingman

[57] ABSTRACT

An automated manufacturing cost estimating method and system with indirect cost allocation which identifies a material in an initial state for manufacturing a product in a final state; defines an operation for converting the material from its initial state into the final state of the product; calculates the direct labor cost for each operation based on direct labor hours and calculates the indirect cost specifically allocated for each operation based on consumption of overhead cost elements by the operation; and sums the cost calculated for each operation to determine the total cost of manufacture of a part. Also disclosed is a cost analyzing method and system which utilizes the cost estimating method and system by identifying a plurality of different materials in an initial state for manufacturing a product in a final state and defining a number of manufacturing operations for converting each of the different materials from its initial state into the final state of the product; generating a plurality of paths through the interconnected operations between the different materials in the initial state and the product in the final state; determining a predetermined cost parameter associated with each operation; and accumulating the determined cost parameters along each path.

34 Claims, 15 Drawing Sheets

Bagging and Autoclave Cost

Thermoplastic Forming Cycle

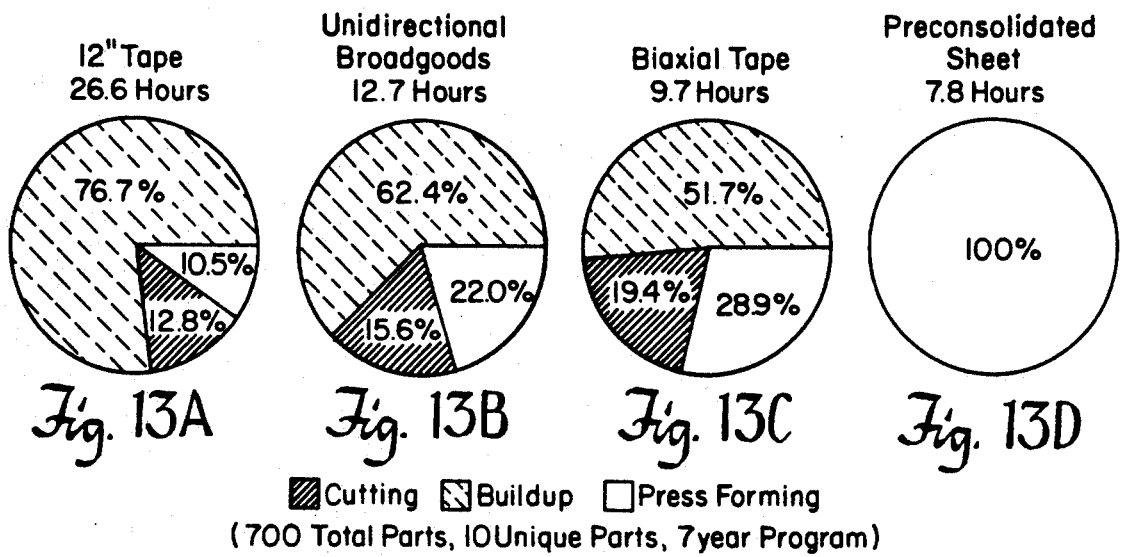
Unit Labor Hours at Each Processing Station
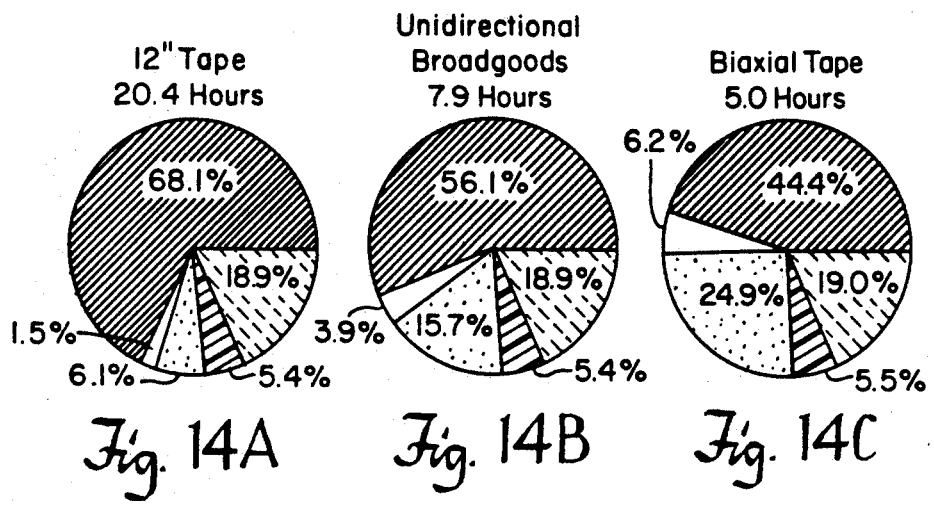
Unit Labor Hours at Buildup Station
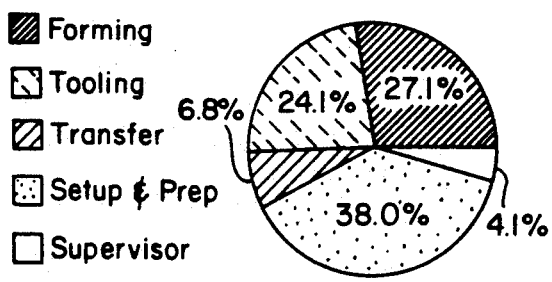
Fig. 15
Unit Labor Hours at
Press Forming Station
(700 Total Parts, 10 Unique Parts, 7 year Program)

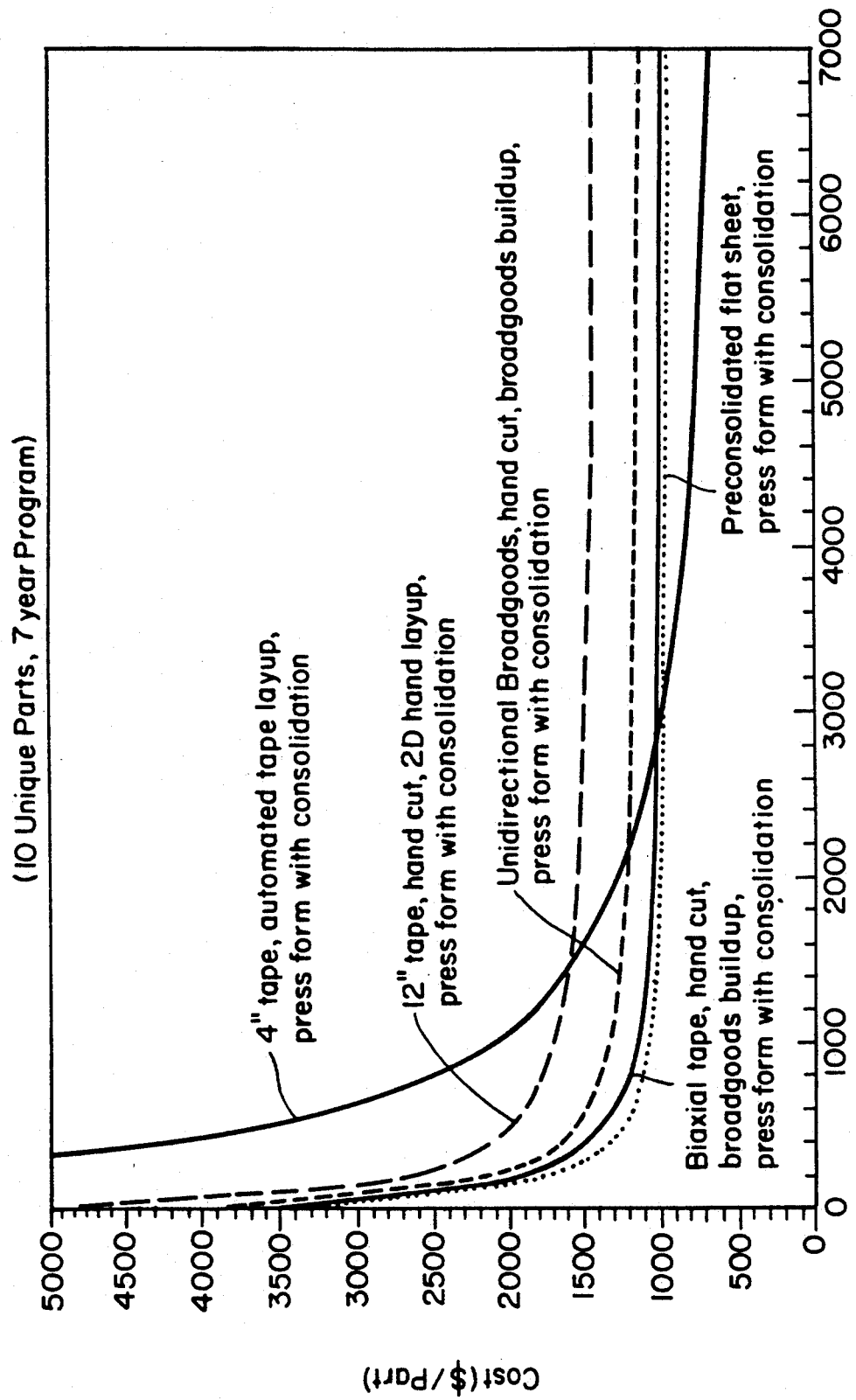
Fig. 16  Total Unit Cost Comparison

Component Costs
(10 Unique Parts, 7yr. Program)

Component Costs
(10 Unique Parts, 7yr Program)

(10 Unique Parts, 7yr. Program)

Automated Tape Layer Unit Labor Hours

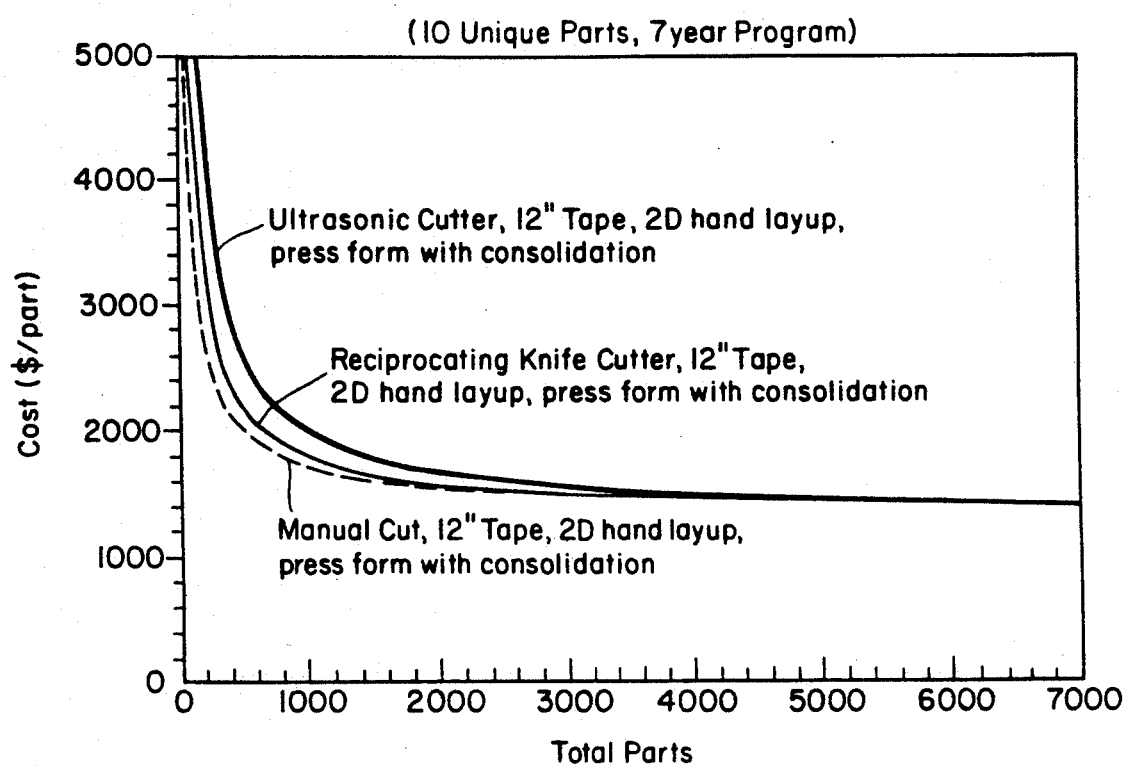
Fig. 19 Total Unit Cost Comparison Automated Cutters
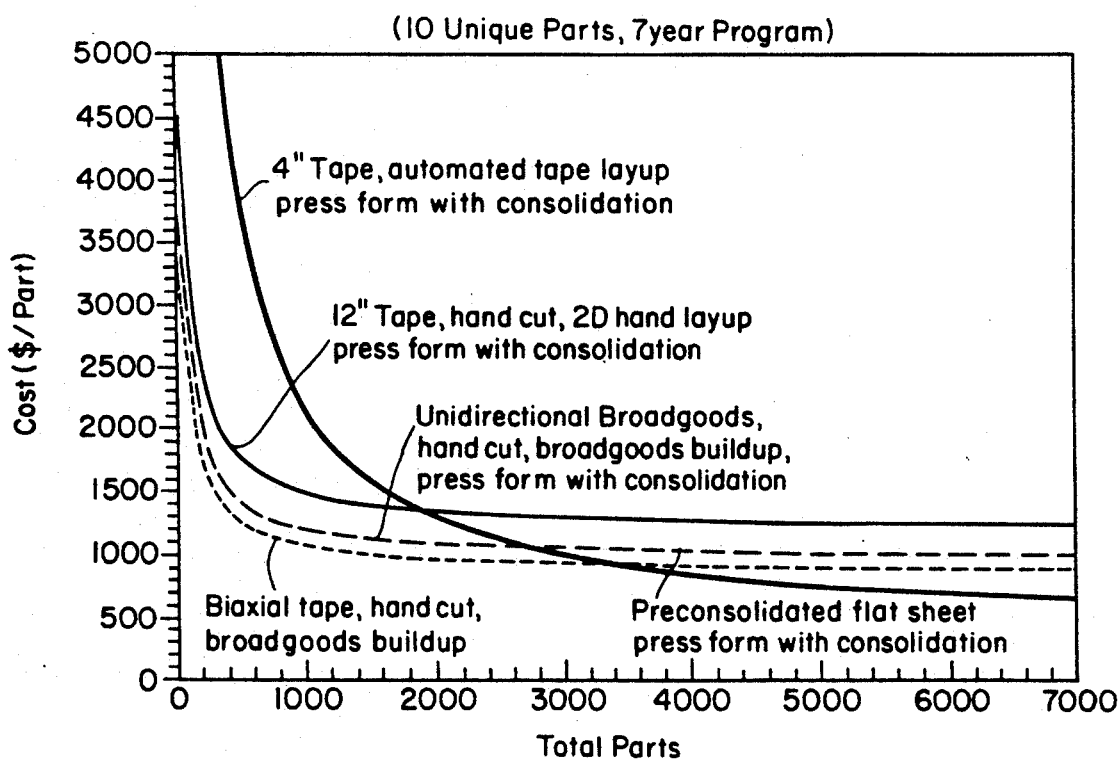
Fig. 20 Total Unit Cost Comparison at High Layup Rate

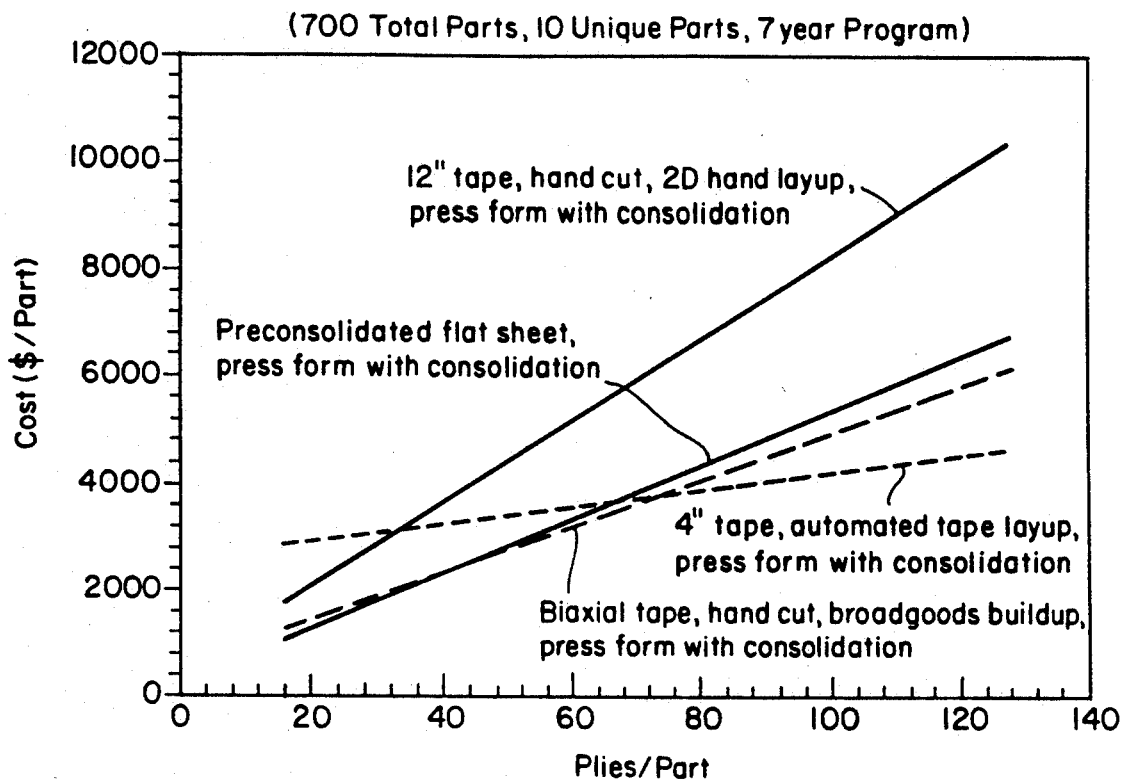
Fig. 21 Effect of Part Size on Total Unit Cost
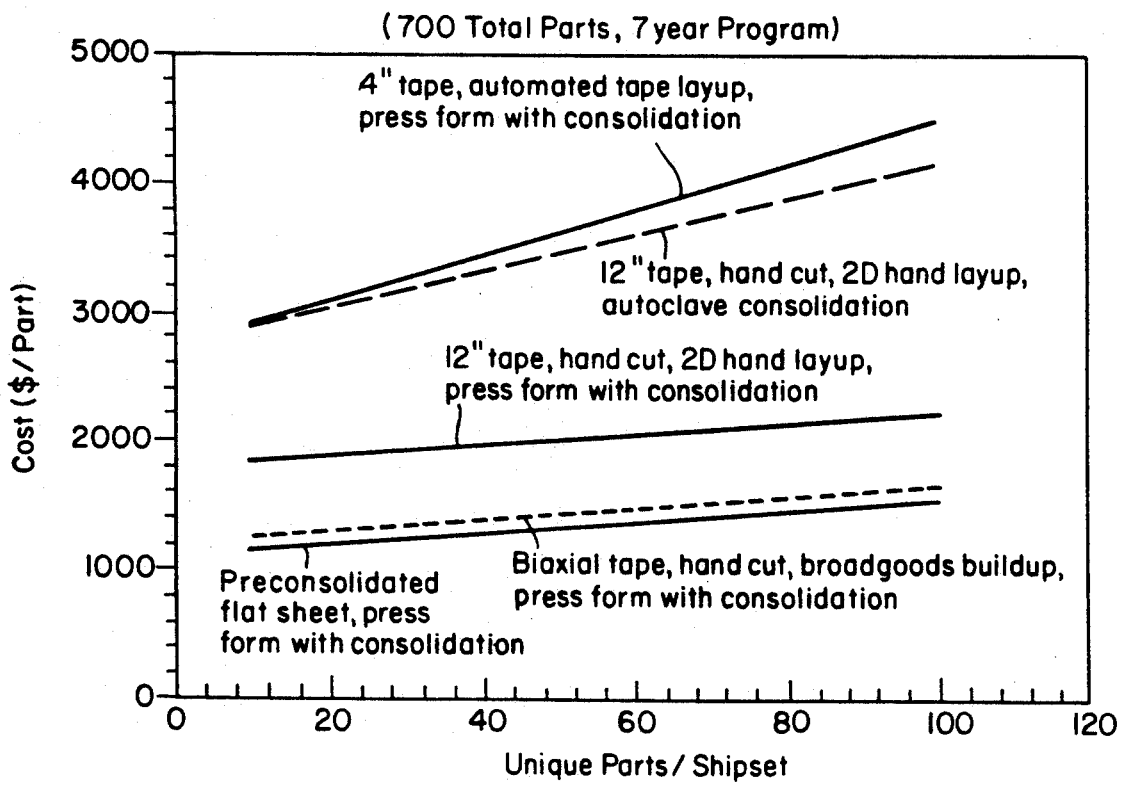
Fig. 22 Effect of Unique Part Count on Total Unit Cost

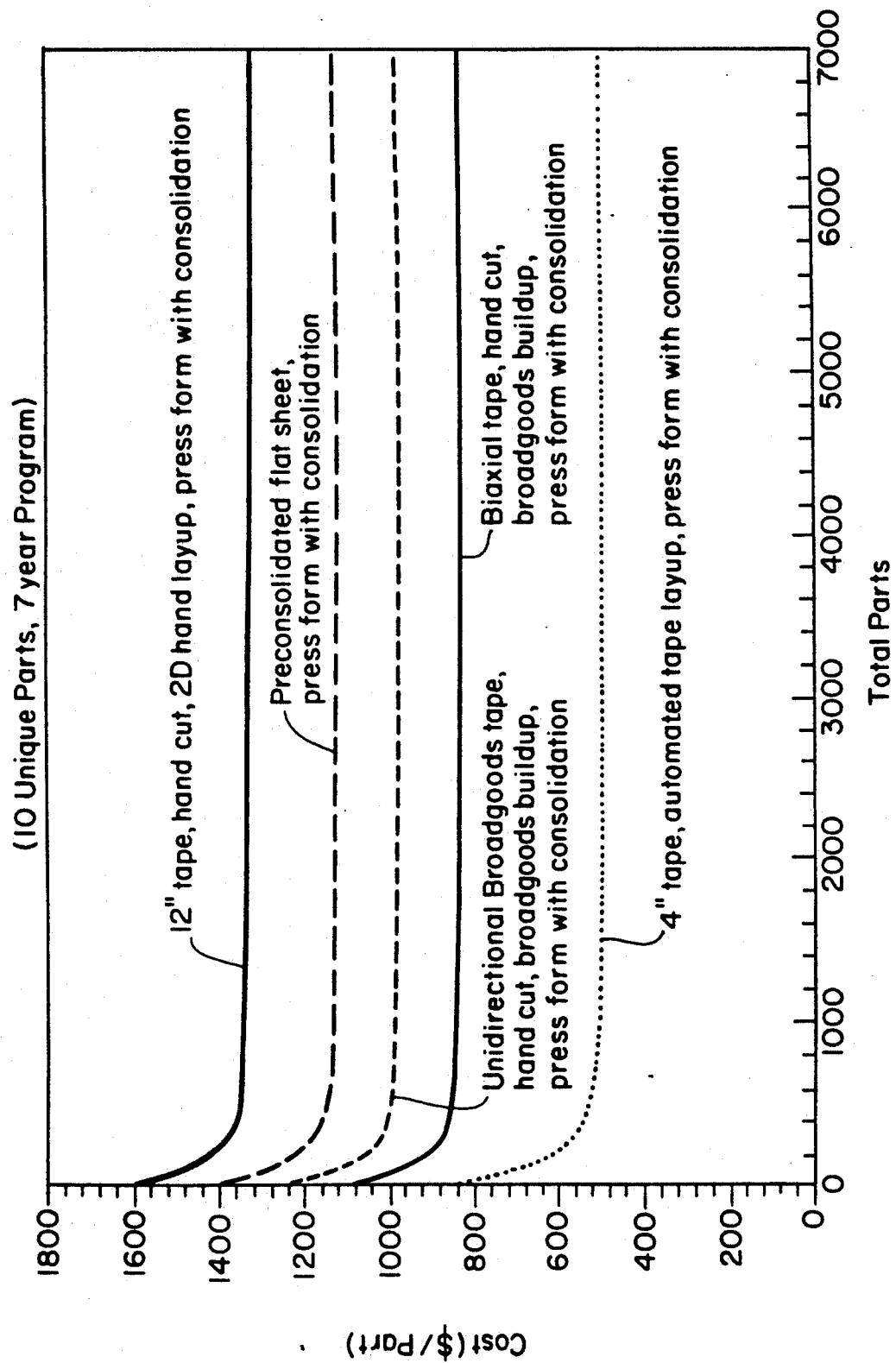
Fig. 23 Total Unit Cost Using Burden Rate Based on Direct Labor

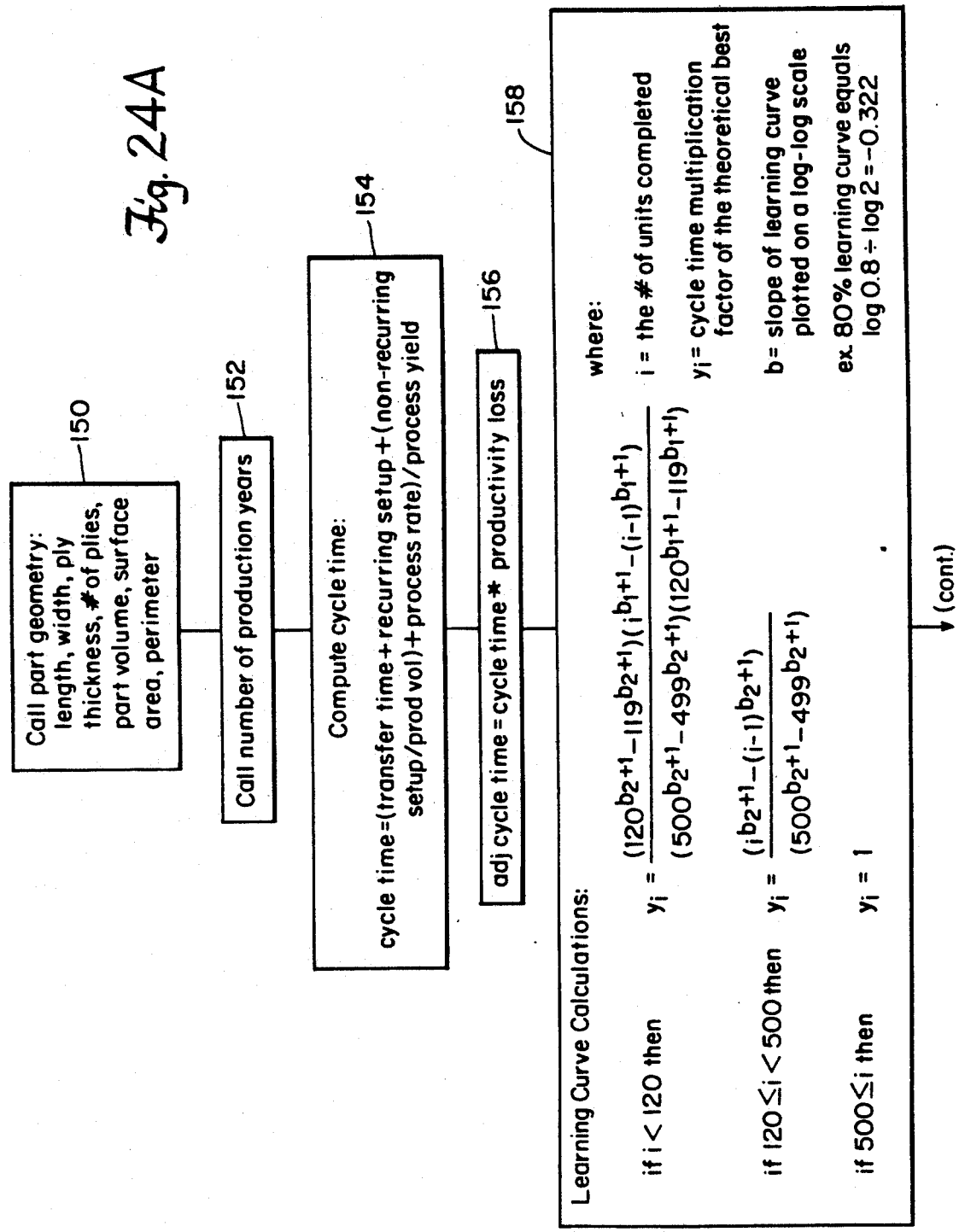

AUTOMATED MANUFACTURING COSTING SYSTEM AND METHOD

FIELD OF INVENTION

This invention relates to an improved automated manufacturing system and method for estimating the cost of manufacturing a part, and more particularly to such a system which uses an automated manufacturing cost estimating system that utilizes both direct and identifiable indirect costs in determining the cost of manufacture and employs an automated manufacturing cost estimating system in an automated manufacturing cost analysis system to help the user to select the most economical fabrication process.

BACKGROUND OF INVENTION

Accurate and reliable cost estimating and cost analyzing techniques are essential in all types of parts manufacturing and fabrication. For example, advanced composite materials are invaluable in designing structures for high performance environments. Their unique mechanical properties make it possible to engineer structures that meet performance requirements (stiffness, strength, etc.) at a lower weight than counterpart designs made of metal. However, advanced composites are very expensive to manufacture, to the point that fabrication cost is currently a major issue affecting the ultimate widespread use of these materials. Numerous research efforts have investigated thermoset composite fabrication processes from various viewpoints and arrived at similar conclusions on how to reduce the high cost of manufacturing composite structures. There is a general consensus that several areas can play a key role; these include part design, materials selection, and cost effective manufacturing processes and automated systems. In all three of these areas, manufacturing cost estimation techniques are needed as a tool for increasing cost effectiveness.

Part designers for all kinds of parts need to design parts and components with manufacturing cost effectiveness in mind. Studies in Concurrent Design and Concurrent Engineering (CD/DE) indicate that a large percentage of the final cost of a product is determined in the early phases of the product life cycle (i.e., the design phase as opposed to production phase); hence it is here that the "window of opportunity" for cost reduction is the largest. However, in order for a designer to design with manufacturing cost in mind from the start, he or she needs a method of estimating how each part feature might affect the total manufacturing cost of the part. For example, a tight radius or steep angle designed into a part immediately imposes limits on the set of feasible processing options which can be designed into a part and on the set of feasible processing options which can be used to make the part. This in turn sets the bounds on final part cost. Ideally, part features which require expensive fabrication processes should be eliminated if possible early in the design phase.

Material selection also plays a large part in cost, not only because the raw material itself is so expensive but also because the material selected often determines downstream manufacturing costs. There are many cases where more than one material can meet the structural and/or weight requirements specified for a given part. For example, in the case of fabrication for an advanced material composite, assume there is a choice between a unidirectional tape and broadgoods from the same resin-impregnated (prepreg) material. Clearly there is a difference in the costs of these raw material forms; unidirectional prepreg materials are less expensive because the material supplier has not gone through the added step of weaving the broadgoods fabric. At the same time, in general it takes more labor to build up a laminate from unidirectional material than to build it up using broadgoods. Therefore there is a tradeoff between actual raw material costs and the downstream manufacturing costs which are predetermined in choosing a particular raw material. It is important in selecting materials to be able to quantitatively estimate the costs of this tradeoff in order to choose the material that will be the most cost effective overall.

Manufacturing cost estimation techniques are just as important to a machine designer or process engineer as they are to a part designer or material selection team. When designing automated machinery or new fabrication processes, system designers must consider the overall costs of the existing operations they expect to replace. One study of fabrication processes suggests that past efforts to automate the processes were not cost effective in comparison with manual layup since the reduction of direct labor costs did not exceed the capital investment in equipment. To insure that any effort to develop automated manufacturing equipment will produce a machine that is cost effective, the designer must understand a priori where and how manufacturing costs are incurred and what factors drive the cost of the final manufactured part.

SUMMARY OF INVENTION

It is therefore an object of this invention to provide an improved automated manufacturing cost system and method for more accurately estimating the cost of manufacturing of a part.

It is a further object of this invention to provide such a system and method which unbundles the indirect costs from the overhead burden for a manufactured part.

It is a further object of this invention to provide such a system and method which utilizes both direct and identifiable indirect costs in determining cost of manufacture.

It is a further object of this invention to provide such a system and method which reveals the tradeoff between raw materials costs and downstream manufacturing costs.

It is a further object of this invention to provide such a system and method which points out the more economical fabrication techniques.

It is a further object of this invention to provide such a system and method which reveals cost effectiveness of high-cost, value added starter materials which require less labor input.

It is a further object of this invention to provide such a system and method which accentuates the cost effectiveness of automated techniques which reduce labor and use low cost starter materials.

It is a further object of this invention to provide such a system and method which identifies separate components of overhead costs invaluable in understanding the true cost difference between various process paths.

It is a further object of this invention to provide an improved manufacturing cost estimating system which more accurately estimates the cost of manufacturing a part.

It is a further object of this invention to provide an improved comparison system utilizing the improved automated manufacturing cost estimating system for more accurately selecting the most economical manufacturing process for a part.

The invention results from the realization that a truly accurate and reliable automated manufacturing costing technique for estimating cost of manufacturing of a part can be effected by unbundling the indirect costs from the overhead burden and using both the direct and identifiable indirect costs to determine the real cost of making a part and by using such an estimating system to effect comparison between different manufacturing processes to highlight the most economical one.

This invention features an automated manufacturing cost estimating system with indirect cost allocation. There are means for identifying material in a initial state for manufacturing a product in a final state and means for defining an operation for converting the material from its initial state into the final state of the product. There are also means for calculating the direct labor cost for each operation based on direct labor hours and calculating the indirect cost specifically allocated for each operation based on consumption of overhead cost elements by the operation. There are means for summing up the costs calculated for each operation to determine the total cost of manufacture of a part.

In a preferred embodiment, the means for calculating may include means for computing the cost of materials, of equipment, of tooling, and of facilities used in the operation. The means for calculating the direct labor may include means for adjusting the labor cost to accommodate learning curve effects. The means for computing the cost of equipment may include means for amortizing the cost of the equipment, and the means for calculating the direct labor costs may include means for determining both direct and identifiable indirect labor costs.

The invention also features an automated manufacturing cost estimating method with indirect cost allocation, which includes the steps of identifying a material in an initial state for manufacturing a product in the final state; defining an operation for converting the material from its initial state into the final state of the product; calculating the direct labor costs for each operation based on direct labor hours; and calculating the indirect cost specifically allocated for each operation based on the consumption of overhead cost elements by the operation. Finally, the costs calculated for each operation are summed to determine the total cost of manufacture of a part.

In a preferred embodiment, the calculating step may include computing the costs of materials, equipment, tooling and facilities used in the operation. The calculating step may also include adjusting labor costs to accommodate learning curve effects, and computing the cost of the equipment may include amortizing the cost of the equipment. The calculating step includes determining both direct and identifiable indirect labor costs.

The invention also features an automated manufacturing cost analysis system which utilizes the cost estimating system and method. The automated manufacturing cost analysis system includes means for identifying a plurality of different materials in an initial state for manufacturing a product in a final state; means for identifying a number of manufacturing operations for converting each of the different materials from its initial state to the final state of the product; and means for generating a plurality of paths through the interconnected operations between the different materials in the initial state and the product in the final state. There are means for determining a predetermined cost parameter associated with each operation and means for accumulating the determined cost parameters along each path.

In a preferred embodiment, the means for defining each operation may include means for associating each operation with an input state and an output state to define a node. The means for generating may include means for executing a logic tree algorithm through the nodes. The means for executing may also include means for determining a predetermined cost parameter, means for calculating the direct labor cost for each operation based on direct labor hours and calculating the indirect cost specifically allocated for each operation based on consumption of overhead cost elements by that operation. The means for executing may execute through the nodes from the final state to an initial state. The means for executing may include means for defining the next previous node, means for ascertaining whether that node is in a unique path, means for retrieving data associated with the node if the node is in a unique path and calculating costs for that node, and means for summing the costs for all the nodes in a path when an initial node is attained. The means for executing may further include means responsive to a present node not being in the unique path for finding another next previous node if there are any other possible unique paths. There may also be means responsive to the present node being in the unique path for determining whether the present node contains a final state, and means responsive to a present node not containing a final state to back up to a node with the same final state.

The invention also features an automated manufacturing cost analysis method including the steps of identifying a plurality of different materials in an initial state for manufacturing a product in the final state; defining a number of manufacturing operations for converting each of the different materials from its initial state into the final state of the product, and generating a plurality of paths through the interconnected operations between the different materials in the initial state and the product in the final state. A predetermined cost parameter associated with each operation is determined, and the cost parameters are accumulated along each path to produce the total cost for a part made along that path In a preferred embodiment, the automated manufacturing cost analysis method step of defining each operation may include means for associating each operation with an input state and an output state to define a node. The step for generating may include means for executing a logic tree algorithm through the nodes. The step of determining a predetermined cost parameter may include calculating the direct labor cost for each operation based on direct labor hours and calculating the indirect cost specifically allocated for each operation based on consumption of overhead cost elements by the operation. The execution through the nodes may take place in reverse direction, from the final state back to the initial state. The execution may include finding the next previous node, ascertaining whether that node is in a unique path, retrieving data associated with the node if the node is in the unique path and calculating costs for that node, and summing the costs for all the nodes in a path when an initial node is attained. Execution may also include finding another next previous node if there are any other possible unique paths and the present node is not in a unique path, or if the present node is in a unique path, determining whether the present node contains a final state. The execution may also include responding to a present node not containing a final state to back up or return to a node with the same final state.

DISCLOSURE OF PREFERRED EMBODIMENT

Other objects, features and advantages will occur to those skilled in the art from the following description of a preferred embodiment and the accompanying drawings, in which.

Figure 1:
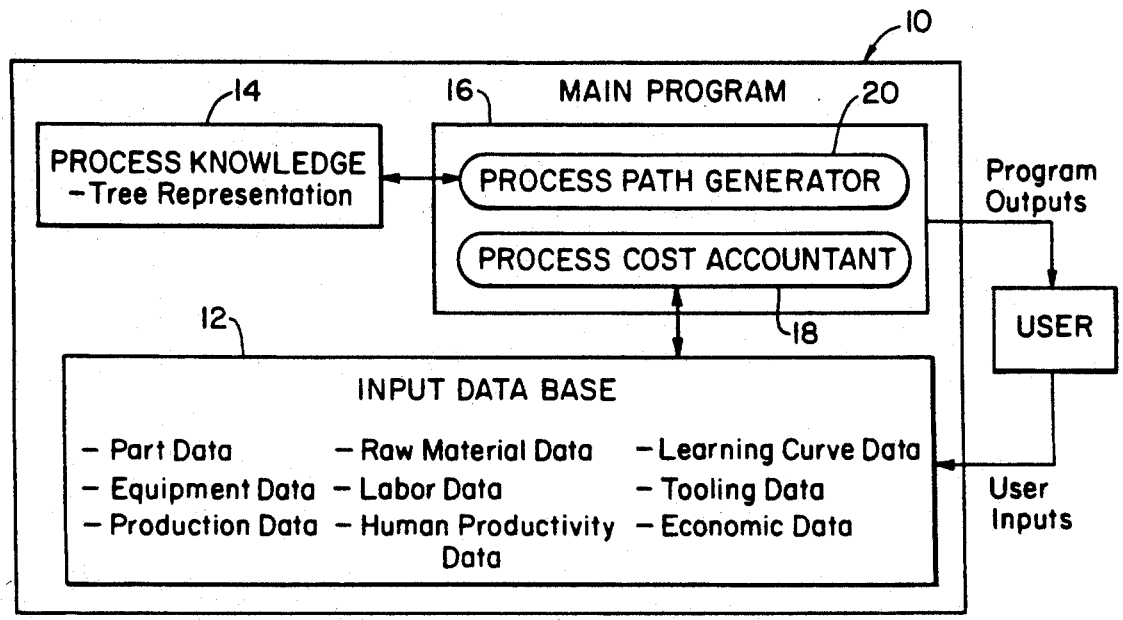
FIG. 1 is a schematic diagram of a thermoplastic composite fabrication cost analysis program.
Figure 17A:
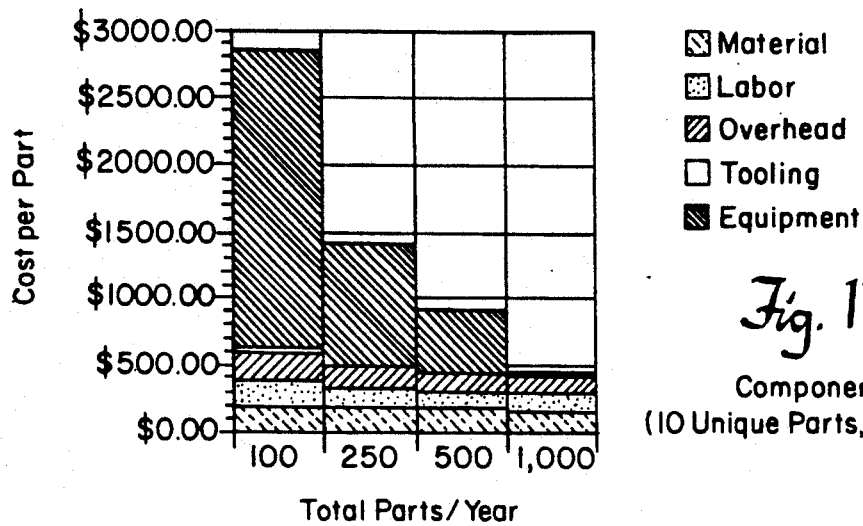
Figure 18A:
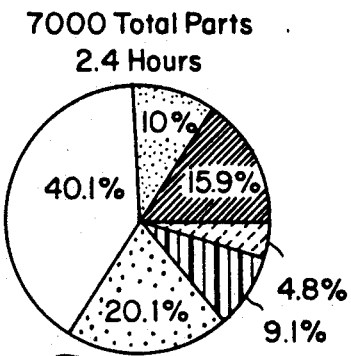
Figure 24B:
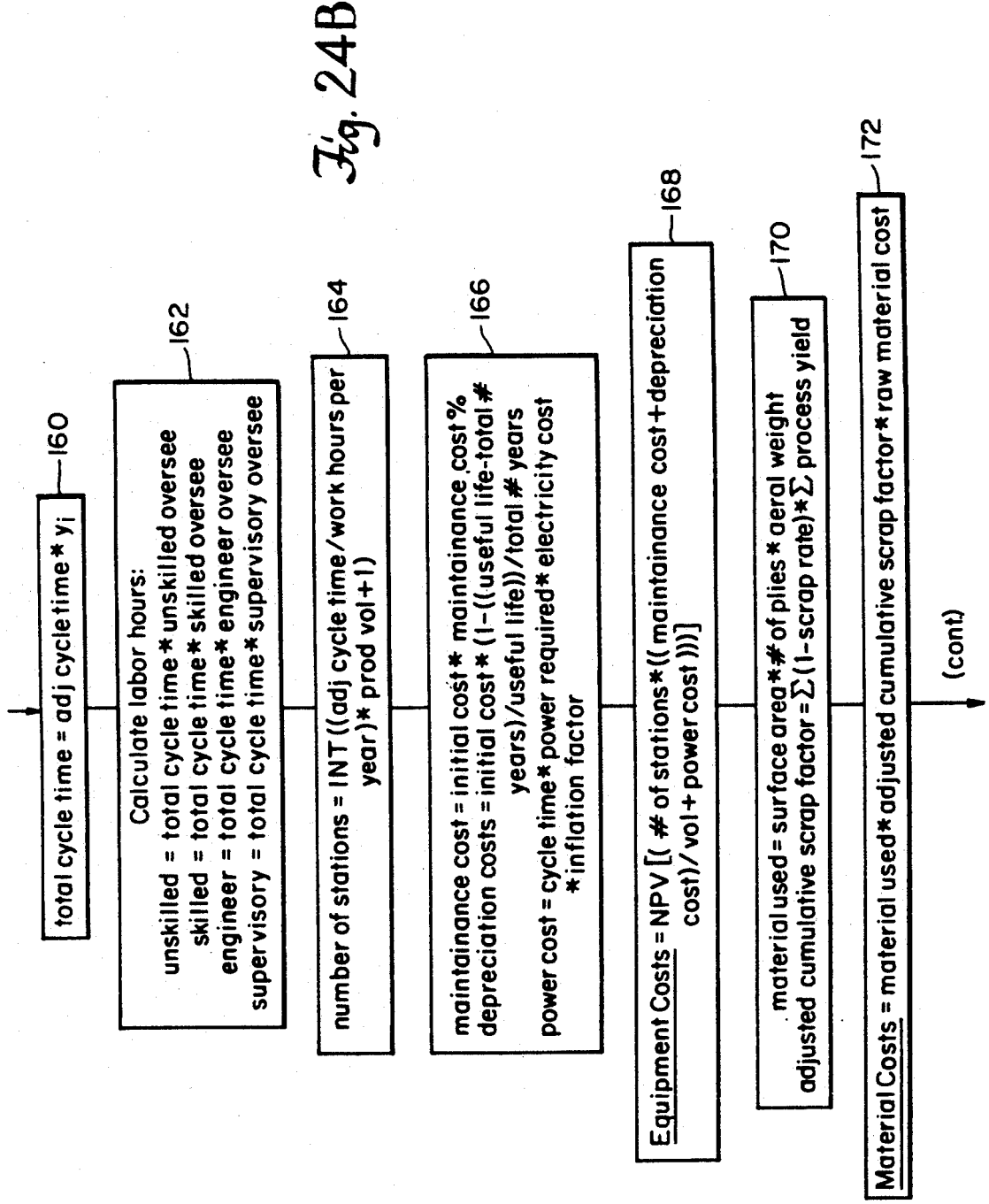
Figure 25:
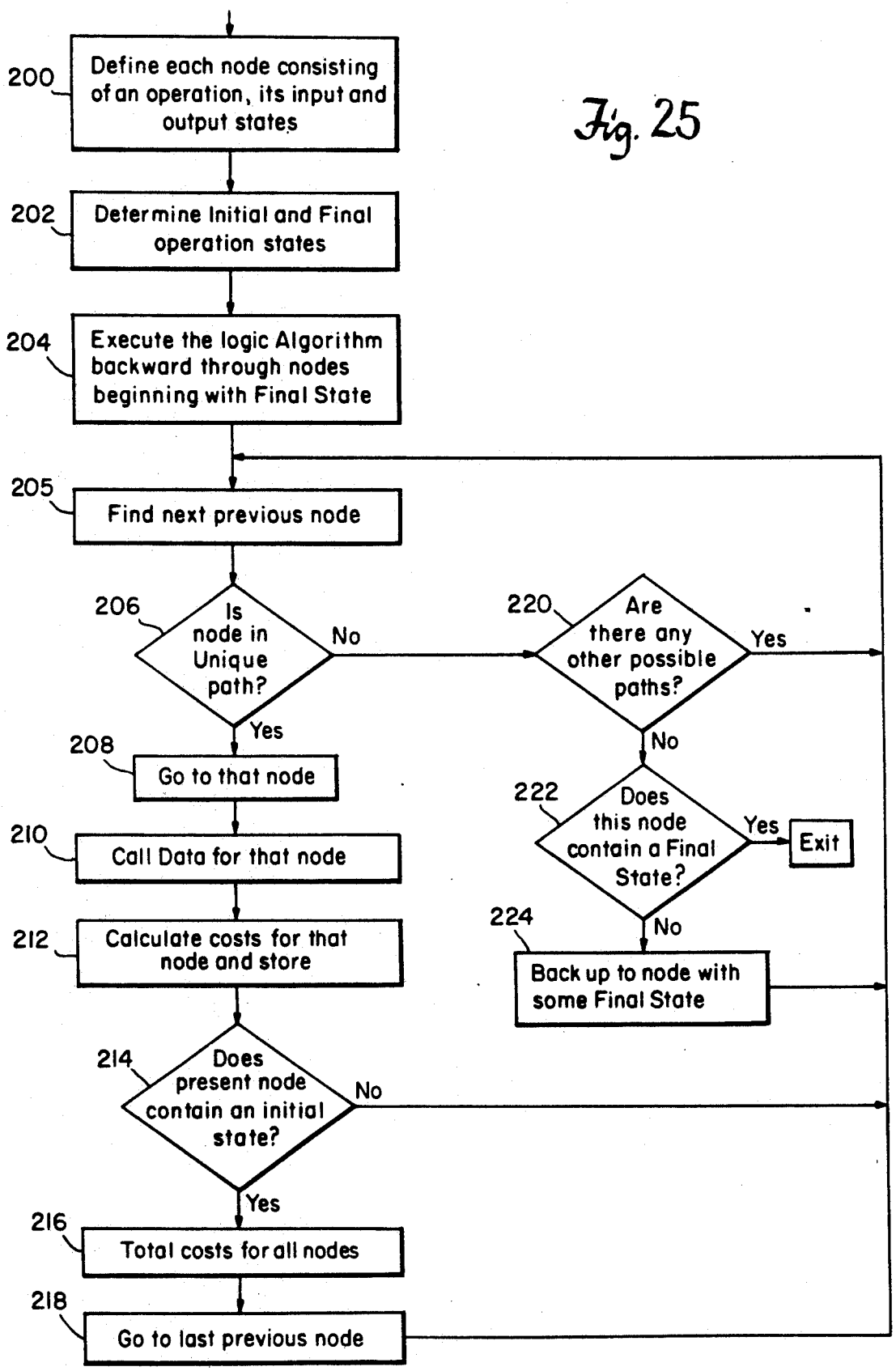

FIGS. 13A-D are pie charts showing unit labor hours at each processing stage for four different starter materials;

FIGS. 14A, 14B, and 14C are pie charts showing unit labor hours at the buildup stations for the starter materials of FIGS. 13A-C;

FIG. 15 is a pie chart illustrating unit labor hours at a press forming station;

FIG. 16 is a graph illustrating total unit cost comparison for the cost in dollars per part versus the total parts;

FIGS. 17A and B are bar graphs illustrating the component costs for four-inch automated tape layers and biaxial tape, respectively;

FIGS. 18A and B are pie charts of automated tape layer unit labor hours for 7,000 and 700 total parts, respectively;

FIG. 19 is a graphical illustration of the total unit cost comparison for automated cutters showing cost in dollars per part versus total parts;

FIG. 20 is a graphical illustration of the total unit cost comparison at high layup rate for cost per part versus total parts;

FIG. 21 is a graphical illustration of the effect of part size on total unit cost which shows cost per part versus plies per part;

FIG. 22 is a graphical illustration of the effect of unique part count on total unit cost which characterizes the cost per part versus the unique parts per shipset;

FIG. 23 is a graphical illustration of the total unit cost using burden rate based on direct labor, showing the cost per part versus the total parts;

FIGS. 24A, B and C depict a more detailed flow chart of the process cost accountant module of FIG. 1; and FIG. 25 is a more detailed flow chart of the process path generator of FIG. 1.

The automatic manufacturing system of this invention may be understood from an example presented with respect to the fabrication of thermoplastic composite parts. The thermoplastic composites fabrication cost estimation program integrates composites processing knowledge and process cost accounting information. The program is used to evaluate the fabrication cost related to the manufacture of a composite part or a set of parts over a given production schedule as specified by the user. Variables stored in the user-modifiable database are manipulated in cost equations to calculate total cost of present dollars over a given period. Although the entire example of the use of the invention uses the fabrication of a thermoplastic composite, this is not a limitation in the invention. The invention is equally applicable to any type of part or set of manufacturing processes.

Figure 2:
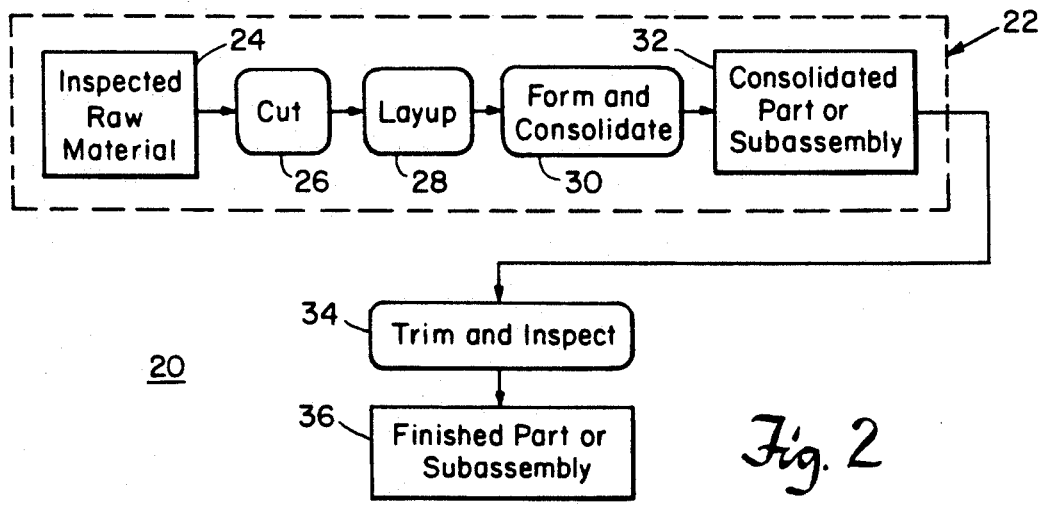
FIG. 2 is a generalized schematic for the process path generator of FIG. 1.

As shown in FIG. 1, the main program 10 receives inputs from its database 12 including data related to parts, equipment, production, raw material, labor, human productivity, learning curve, tooling, and economics. Using input database 12 and a process knowledge logic tree module 14, the main program 16 estimates, using process cost accounting module 18, the costs along a number of different possible manufacturing paths determined by process path generator module 20. The program 10 is structured to examine a large number of processing options. These operations are represented in process paths, each consisting of a number of sequential steps. A generalized format for such a process path 22 is shown in FIG. 2 with respect to a specific thermoplastic composite fabrication example. Process path 22 begins with inspected raw material in step 24 and ends as an untrimmed, uninspected part or subassembly. The preliminary inspection of the material and post-inspection and trimming operations are assumed to be equivalent for all the processes considered and are therefore not dealt with in the process comparisons. Nevertheless, they will contribute to total manufacturing cost.

After inspection of the raw material in step 24, the material is cut in step 26 and layup is effected in step 28. The material is formed and consolidated in step 30, resulting in the consolidated part or subassembly 32. After this, common steps of trimming and inspecting 34, resulting in the finished part or subassembly 36, are effected.

In analyzing various processes the program steps through each process path, from raw materials to the finished part, incrementally calculating all the costs associated with each step of the path. The following separate components of the total part cost are calculated: equipment cost; labor cost; labor overhead cost; materials cost (direct and indirect); tooling cost; and cost of factory floor space.

Variables which affect the cost of the final part are stored in several databases which may be modified by the user. FIG. 1 illustrates the interactions between the user, the databases, and the cost analysis program. The databases are files of information which remain constant during a run of the program. For instance, labor data might contain a variable which defines the cost of an unskilled laborer in $/hr and part data might contain the width of a part in inches.

To generate different runs, the user changes variables in the input database. The results of these changes are reflected in a new cost for each process examined by the program. For example, to see the effects of larger part volumes on the cost of automation, the user would edit the production data file and change the number of shipsets per year or the number of parts per shipset. To check the sensitivity of the final part cost to the cost of skilled labor, he would change this value in the data file and rerun the program. A shipset is used in the aircraft industry to refer to the ultimate product, e.g. the airplane, each of which may contain a number of a particular part.

Cost information is calculated using standard process costing methodologies and procedures. Expenses are charged as Cost of Sales in the period when the goods are delivered. Labor rates and other exogenous cost factors which were expected to rise with inflation in the future are adjusted using an inflation index It is assumed that the plant runs two shifts a day, 250 days per year, and that (in all cases except the autoclave) at least one operator oversaw each machine 100% of the time. Equipment is amortized using a straight line depreciation according to 1989 I.R.S. guidelines. The modified accelerated capital recovery system (MACRS) was also investigated as an alternative depreciation method, but it was found that the depreciation method used had little effect on the overall analysis.

Figure 3:
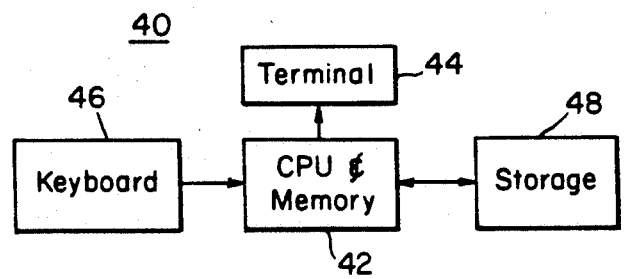
FIG. 3 is a schematic block diagram of a computer which may be used to implement the programs of FIGS. 1 and 2.

System 10 and the included system 22 may be executed on computer 40, FIG. 3, having a CPU memory 42, terminal 44, keyboard 46, and storage 48, which may be any one of a number of currently available computers such as a SUN 3/160 or MacIntosh.

Figure 4:
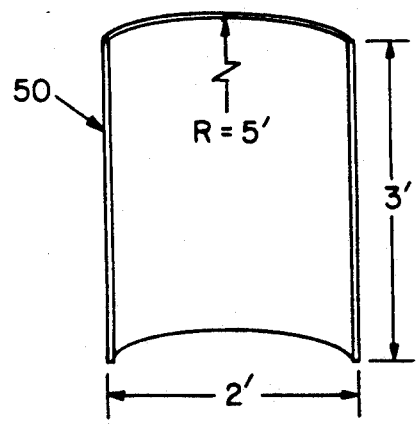
FIG. 4 is an illustration of a single curvature thermoplastic skin to be fabricated by the automated manufacture process system according to this invention.

An illustration of the part analyzed with the system according to this invention is shown in FIG. 4 as a single curvature thermoplastic composite 50 two feet by three feet in size, with a radius of curvature of five feet, and formed of a number of plies, typically from 16 to 128. The overall weight of composite 50 is approximately 2.8 pounds. A number of manufacturing processes can be considered in the cost evaluation by the process knowledge module 14, FIG. 1, as shown in more detail in FIG. 5, where the ovals represent material states and the boxes represent stations in the factory. There were five starting options considered: a preconsolidated flat sheet 60; four-inch tape 62; twelve-inch tape 64; unidirectional broadgoods 66; and biaxial broadgoods 68. There were a number of steps that were specific to the particular starting material For example, four-inch tape 62 underwent an automated two-dimensional layup in step 70. Twelve-inch tape 64 had three options: it could be cut ultrasonically 72, by knife 74, or by hand 76, after which the material in the cut state 77 is submitted to hand layup 78. Both the unidirectional broadgoods and biaxial broadgoods 68 were handcut in step 80, resulting in cut material 81, and then built up in step 82. After that various paths were available through the consolidated flat sheet state 84, unconsolidated flat sheet 86, and three-dimensional unconsolidated part preform, step 88. Following this there were available press forming with consolidation in step 90, or press forming without consolidation, step 92, followed by unconsolidated skin assembly in step 94, which in turn was followed by vacuum bagging in step 96, resulting in bagged part 97, and autoclave consolidation in step 98. The final step from all paths is the consolidation to skin in step 100. Each station or operation with its attendant, shared input and output states constitutes a node Initial nodes have no shared inputs or initial states. The final node has no shared outputs or final states. The large number of combinatorial possibilities contained in this tree representation presents a large logistical problem. For this reason, artificial intelligence techniques are used to search for all the viable paths through the tree as discussed with respect to FIG. 25. The process generator uses PROLOG. With this approach, hundreds of separate processes could be evaluated simultaneously in one run of the program. For single curvature skin 50, for example, a total of thirty-nine processes can be evaluated Five material forms are considered in the cost analysis example. These are summarized in Table I. The projected cost of these materials was adjusted to reflect the size of the order. In general the cost of each material form depends upon the amount of value added to the material by the supplier. The cost of common twelve-inch tape used for hand layup operations and four-inch tape used on the automated tape layer represent a baseline cost for thermoplastic materials.

TABLE I

| Raw Material | Cost ($/lb) |
| --- | --- |
| 12" Unidirectional Prepreg Tape | $75.00 |
| 4" Unidirectional Prepreg Tape | 75.00 |
| Unidirectional Prepreg Broadgoods | 150.00 |
| Biaxial Broadgoods | 140.00 |
| Pre-consolidated flat sheet | 357.00 |

Unidirectional broadgoods consist of unidirectional tape that has been spliced together by the material supplier. Biaxial broadgoods are produced by slitting tape into smaller strips and weaving into a broadgoods fabric. Preconsolidated sheets are laid up and consolidated to use specifications by the supplier and can be shipped like plywood, complete with C-scan inspections. In the case of the latter three materials, the material supplier has added value (hence cost) to the material by providing it in a form which is in some way more desirable to the end user. This desirability usually relates directly to ease of use. Materials that are easier to use reduce the manufacturing labor content and therefore lower labor costs. In the subsequent analysis of program results, tradeoffs between material cost and labor costs and how these affect total fabrication costs are examined for the various materials at different production volumes.

The total cost for manufacturing thermoplastic parts in a particular production program is a function of the number of different parts per shipset and the number of shipsets per year, as shown in the following equation:

| $C_{total} =$ | NPV (Cost_per_partj) * Shipsets_per_year) (1) |
| --- | --- |
| where: | |
| $C_{Total} =$ | Total cost over entire production period |
| $i =$ | year (1 to N) of an N year production period |
| $j =$ | number of discrete parts (1 to M) per shipset during production period |
| NPV( ) = | Net Present Value Function |
| Cost_per_part = | Cost per discrete part in current $ |
| Shipset_per_year = | Number of Shipsets in a given year i |

The total Cost_per_part for a particular part is calculated using the following equation:

$$\text{Cost\_per\_part} = C_E + C_M + C_L + C_{OHD} + C_T + C_F \quad (2)$$

where:
- $C_E$ = Cost of Equipment
- $C_M$ = Cost of Materials
- $C_L$ = Cost of Labor (Based on direct and identifiable indirect labor hours)
- $C_{OHD}$ = Cost of Labor Overhead (Overhead Burden Rate and Benefits Rate charged to all identifiable labor hours)
- $C_T$ = Cost of Tooling
- $C_F$ = Cost of Floorspace The individual cost components ($C_E$, $C_M$, etc.) in Equation 2 are calculated taking into account the considerations in Table 2.

TABLE 2

| Considerations in Cost Calculations | |
|---|---|
| Cost Component | Considerations |
| Cost of Equipment, $C_E$ | Initial cost of equipment<br>Depreciation cost over anticipated production period as % of total useful life of equipment<br>Cost of power to run equipment§<br>Cost of equipment maintenance required<br>Cost of equipment downtime<br>Cycle time per part* |
| Cost of Materials, $C_M$ | Cost of raw materials (in $/lb.)<br>Total material in each completed part<br>Cumulative scrap rate for total process used to produce each part (adjusted for learning curve effects*)<br>Cumulative process yield for process path (adjusted for learning curve effect*) |
| Cost of Labor, $C_L$ | Direct labor hours per part<br>Indentifiable indirect labor hours per part (supervisors, programmers, inspectors, etc.)<br>Labor rates (in $/hr.) §<br>Productivity loss due to idle time, personal time, fatigue<br>Cumulative process yield for process path<br>Adjustment for learning curve effects* |
| Cost of Labor Overhead, $C_{OHD}$ | Direct and identifiable indirect labor hours per part<br>Overhead Burden Rate (including OHD, General and Admin. Expenses, Support Services, etc.)*<br>Benefits Rate |
| Cost of Tooling, $C_T$ | Tool Material Cost§<br>Tool life (in parts made/tool)<br>Tool Fabrication Time<br>Mold Material Cost§<br>Mold life (in tools/mold)<br>Mold Fabrication Time<br>Cleaning Time<br>Tool Repair Cost |

TABLE 2-continued

| Considerations in Cost Calculations | |
|---|---|
| Cost Component | Considerations |
| Cost of Floorspace, $C_F$ | Cost of disposable parts (peel plies, vacuum bags)<br>Floorspace required<br>Cost of floorspace (in $/sq. ft.)<br>Maintenance cost of floorspace (in $/sq. ft.)§ |

*Cycle time calculations, overhead burden rates, and learning curve effects are discussed elsewhere
There is a provision so that delineations can be made for the following skill levels: skilled, unskilled, supervisor, engineer
§Adjusted for inflation. In the case of Tool and Mold materials, the cost of materials such as steel which are expected to follow inflation was adjusted while the cost of materials such as graphite/epoxy were not.

How one accounts for manufacturing overhead costs plays a key role in how to go about analyzing and comparing the various manufacturing options available from a cost estimation viewpoint. From a machine designer's point of view, it is important to accurately understand where manufacturing costs originate in order to design cost effective automated systems. In a CD/CE environment, part designers can also benefit from manufacturing cost tradeoff studies since this gives them the opportunity to design the parts with an a priori knowledge of the manufacturing costs involved. For these reasons, it is beneficial to separately identify and consider as many components of the total manufacturing cost as possible.

A traditional cost accounting scheme is to separate the cost of a finished part into three items:

$$\text{Total Cost} = \text{Cost of Direct Materials} + \text{Cost of Direct Labor} + \text{Overhead Cost} \quad (3)$$

The Overhead Application Base can be direct labor hours, direct labor cost, machine hours, material cost, etc. Selection of the base is critical to accurate cost accounting. While labor intensive manufacturing operations are best served with a direct labor overhead base, a Flexible Manufacturing System (FMS) operation might choose a machinery related overhead base.

The size of the cost pool to which the Overhead Burden Rate is applied plays a key role in how useful it will be to someone in accurately assessing product costs and in making manufacturing or design strategy decisions. One study cited the fact that 59% of U.S. manufacturing operations surveyed used an individual plant or multiple plants as a cost pool to which they applied their overhead rate. Using this cost accounting method, all facilities, tooling, equipment, and all employees in the entire manufacturing operation who do not charge a direct labor hour to a part must be absorbed in an ever-growing burden rate. For aerospace manufacturers, a set of average values for the Overhead Burden Rate and other components of the total Wrap Rate is given in Table 3.

TABLE 3

| Average Wrap Rates for a Manufacturing Facility in the Aerospace Industry | | |
|---|---|---|
| Wrap Rate<br>Cost Component | Cost as % of<br>Direct Labor | Cost in $/hr<br>(assuming 22$/hr. Direct Pay) |
| Direct Labor | N.A. | $22.00 |
| Overhead Burden Rate<br>    Facilities/Equipment/Tooling<br>        Capital Investment<br>        Maintenance of Facilities and Equipment<br>    Workers not charging Direct Labor Hours (DLH)<br>        Personnel Dept. | 114% | $25.00 |

TABLE 3-continued

| Average Wrap Rates for a Manufacturing Facility in the Aerospace Industry | | |
| --- | --- | --- |
| Wrap Rate Cost Component | Cost as % of Direct Labor | Cost in $/hr (assuming 22$/hr. Direct Pay) |
| Guards | | |
| Expeditors | | |
| Part Runners | | |
| Industrial Eng. | | |
| Programming | | |
| Q/A | | |
| Low level management | | |
| Floor supervision not charging DLH | | |
| Other support services | | |
| etc. | | |
| Fringe Benefits | 41% | $9.00 |
| Accrual for Holiday/Vacation | | |
| Accrual for Retirement/Savings | | |
| Life/Health Insurance | | |
| Morale/Welfare/Misc. | | |
| Gen and Admin. | 27% | $6.00 |
| Other Charges | 14% | $3.00 |
| Training | | |
| Some other materials | | |
| Misc. | | |
| Wrap Rate Multiplier | 196% | TOTAL WRAP RATE $65.00/hr. |

Some or all of each of these categories are considered separately in cost model

The fact that over 50% of the total Wrap Rate cost is "hidden" in one lump sum (the Overhead Burden Rate) makes it very difficult to decompose any cost accounting data represented in this manner. Analysis and comparison of different manufacturing processes is therefore hindered using this accounting method.

For this reason, the individual components of the Overhead Burden Rate portion of the total wrap rate listed in Table 3 are separated out. This is why Equation (2) explicitly includes capital investments in Equipment, Floorspace, and Tooling as separate components of the total manufacturing cost. Equipment maintenance, maintenance of the floorspace, and tool cleaning and repair are also considered as subcomponents of each of these new categories, respectively (see Table 2). Also, in computing labor costs, an attempt was made to separately identify as many as possible components of the labor associated with making each part. For this reason, even though machine programming time and supervisory labor might not normally be considered as "direct labor hours" in a traditional sense, they are included as separate items in the "identifiable labor hours" component of Equation (2). Correspondingly, the Overhead Burden Rate used in the cost model was reduced to account for these provisions. Table 4 shows the default Overhead Burden Rate and other components of the total Wrap Rate used in the model. The Overhead Burden Rate is charged against a base of labor hours since most cost components of the Wrap Rate relate to labor.

TABLE 4

| Wrap Rate Data Used in Thermoplastic Cost Estimator Model | | |
| --- | --- | --- |
| Wrap Rate Cost Component | Cost as % of Direct Labor | Cost in $/hr (assuming 22$/hr. Direct Pay) |
| Direct Labor | N.A. | $22.00 |
| Overhead Burden Rate | 29% | $6.00 |
| Workers not charging Direct Labor Hours | | |
| Guards | | |
| Expeditors | | |
| Part Runners | | |
| Support Services | | |
| Management | | |
| etc. | | |
| Fringe Benefits | 41% | $9.00 |
| Gen and Admin. | 27% | $6.00 |
| Other Charges | 14% | $3.00 |
| Wrap Rate Multiplier | 111% | TOTAL WRAP RATE $46.00/hr. |

A number of databases contain information which is used as input data for the cost calculations. Tables 5-9 list such data.

TABLE 5

| Default Equipment Data Used in Cost Study | | | | | | |
| --- | --- | --- | --- | --- | --- | --- |
| Machinery | Cost ($) | Power Req'd (KW) | Programming (hrs./discrete part) | Non-recurring Setup (hrs/part) | Recurring Setup (hrs/part) | Productivity |
| Tape Layer[1] | 1.8M | 37.5 | 160 | 1 | 1 | 10 lbs/hr |
| Press Former[2] (consolidating, 2D to 3D) | 150K | 54 | 0 | 4 | 1 | 1 part/hour |
| Press Former[2] | 150K | 54 | 0 | 4 | 1 | 1.1 parts/hour |

TABLE 5-continued

Default Equipment Data Used in Cost Study

| Machinery | Cost ($) | Power Req'd (KW) | Programming (hrs./discrete part) | Non-recurring Setup (hrs/part) | Recurring Setup (hrs/part) | Productivity |
|---|---|---|---|---|---|---|
| (consolidating, 3D to 3D) Press Former[2] | 150K | 45 | 0 | 4 | 1 | 1.4 parts/hour |
| (non-consolidating) 5 × 14 autoclave[3] | 220K | 60 | 0 | 0 | 1 | 1 part/hour |
| 12 × 30 autoclave[3] | 1.2M | 100 | 0 | 0 | 0.75 | 5 parts/hour |
| knife cutter[4] | 120K | 34 | 4 | 0.25 | 0.75 | 800 in/min |
| ultrasonic cutter[5] | 380K | 45 | 4 | 0.25 | 0.75 | 200 in/min |

This maximum flat out rate was adjusted for machine acceleration and turnaround time
Sources: [1]Cincinatti Millicron; [2]Average values from Wabash,PHI, OEM; [3]Autoclave Systems, for our part we assumed 5 × 14 has 5 part capacity, 12 × 30 has 25 part capacity; [4]Gerber Garment Technologies; [5]American GFM
NOTES: Setup times, programming times, and productivity figures are based on equipment manufacturer's specifications, and in some cases were adjusted to match empirical data gathered from industry. Times listed here are projected as theoretical best values, and will be adjusted for learning curve effects.

TABLE 6

Default Human Productivity Data Used in Cost Study

| Parameter | Range | (units) |
|---|---|---|
| Hand Layup - 12" Tape | 0.25-0.33 | lbs./hr |
| Hand Layup - Unidirectional Broadgoods | 0.78-1.65 | lbs./hr |
| Hand Layup - Biaxial Broadgoods | 1.56-3.33 | lbs./hr |
| Manual Cutting Rate | 6000.00 | inches/hr |
| Bagging time per part | 1 | hour/part |

NOTES: Data here represents industry average values. In the sensitivity analysis, layup rates were varied to represent typical high and low industry values. Layup of biaxial broadgoods is twice as fast as unifirectional broadgoods since each ply of the material contains two complete fiber orientations. It was assumed that 3D layup on our gentle curvature was some percentage slower than 2D layup. This percentage was varied from 20% to 50%. All productivity figures are projected as theoretical best values, and will be adjusted for learning curve effects.

TABLE 7

Default Labor Data Used in Cost Study

| Parameter | Value | (units) |
|---|---|---|
| Skilled Labor Rate | 23.00 | $/hr. |
| Unskilled Labor Rate | 18.00 | $/hr. |
| Engineer Labor Rate | 24.00 | $/hr. |
| Supervisor Labor Rate | 25.00 | $/hr. |
| Hours per shift | 8 | |
| Shifts per year | 2 | |
| Workdays per year | 250 | |
| Productivity Loss (due to fatigue, personal time, idle time, etc.). | | |
| Hand Labor | 35 | % |
| Skilled Labor | 25 | % |
| Supervisory Labor | 25 | % |

Source: [Ref (19)].

TABLE 8

Miscellaneous Data Used in Cost Study

| Parameter | Value | (units) |
|---|---|---|
| Interest Rate for N.P.V. | 10 | % |
| Electricity Cost[1] | 0.04 | $/KW |
| Land Cost[2] | 35.00 | $/square foot |
| Maintenance Cost[3] | 0.63 | $/square foot |
| First Learning Curve Knee | 120 | units |
| Second Learning Curve Knee | 500 | units |

Sources: [1]Cambridge Electric Light Co; [2][Ref (19)]; [3][Ref (18)], adjusted for inflation.

TABLE 9

Default Tooling Data

| Tool Type | Tool Material Cost ($/sq. ft.) | Tool Life (parts/ tool) | Tool Fabrication Time (hours) | Mold Material Cost ($) | Mold Life (tools/ mold) | Mold Fabrication Time (hours) |
|---|---|---|---|---|---|---|
| Graphite[1] | 2000.00 | 20 | N/A* | N/A | N/A | N/A |
| Electroformed nickel[2] | 500.00 | 500 | 2 | 468 | 10,000 | 100 |
| Steel | 40.83 | 500 | 60 | N/A | N/A | N/A |
| Ceramic[3] | 66.00 | 20 | 2 | 468 | 10,000 | 100 |

*Tools purchased pre-made from tool sub-contractor requires no in house tool fabrication.
Sources: [1]Average values from UCAR, Stackpole; [2]EMF Corp; [3]A.C.E., Inc.
NOTES: 1" thick steel was purchased for $1/lb. and required 60 hours of labor (10 hrs./sq. ft.)* (6 sq. ft.) to be machined to size. We assumed all parts have a repair cost to account for normal wear (scratches in tool surface, chips, etc.), which averages at $10.00 per part made. We alotted 6 minutes per part for tool cleaning time, a recurring setup cost. Also, tool storage and tool transfer are considered in floorspace and overall cycle time per part calculations, respectively. Tool lifes are based on supplier's specifications, and in some cases were adjusted to match empirical data gathered from industry.

These values were gathered from research publications from industry data, and from communications with composites material suppliers, parts fabricators, equipment designers, and industry consultants. Several data points relating to materials utilization, human productivity, and labor cycle times represent information which is company proprietary or sensitive from a national security standpoint. In the case of company proprietary information, empirical data and parametric models (obtained through plant visits and telephone communications) were averaged to provide a "industry average" value. A number of reports available to qualified government contractors contain parametric models for thermoset fabrication processes which were used when applicable. In addition, empirical data for thermoplastic fabrication is also available.

By modifying the 'production data' data base, different production scenarios can be evaluated. A production run consists of a some number of parts per shipset and some number of shipsets per year, as represented in the examples in Table 10.

TABLE 10

Examples of Production Data Used in Analysis

| | Parts per Shipset | Total # Years | Total # Shipsets | Shipsets per Year |
|---|---|---|---|---|
| Production Run 1 | 10 | 7 | 151 | [1, 4, 8, 16, 32, 45, 45] |
| Production Run 2 | 17 | 7 | 1400 | [200, 200, 200, 200, 200, 200, 200] |

Production Run 1 in Table 10 might be a fighter aircraft program beginning in pre-production and ramping up to full scale production. Production Run 2 might be a program which replaces aluminum parts with composite parts on a commercial aircraft.

Figure 5:
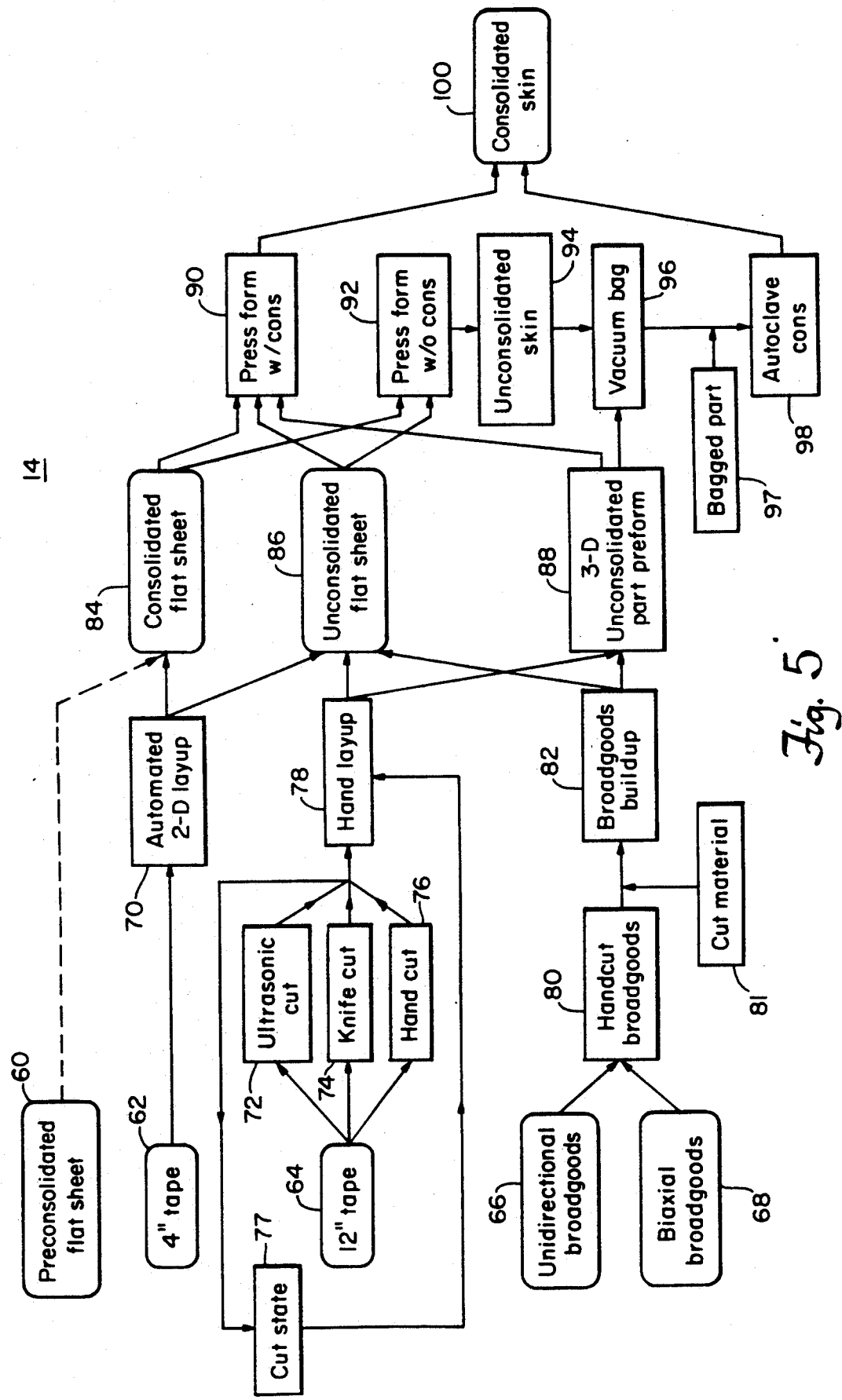
FIG. 5 is a schematic block diagram of the process knowledge module of FIG. 1.

In the Composites Processing Tree in FIG. 5, there is a high level representation of a number of fabrication processes. Each of the "nodes" in FIG. 5 can be treated as a separate operation performed at a discrete station on a factory floor. Therefore, the tree representation is a simplistic way to simulate the flow of materials through a factory. Important factors in this type of simulation are the number of stations required to meet the production schedule, the transfer time between stations, and the actual cycle time (including setup, loading, unloading, etc.) at each station. Note that effects relating to optimal queuing to maximize equipment utilization or to minimize work in process inventory are not included in this model.

The minimum number of machine stations required is a function of the total hours available in a working year and the machine hours needed to meet the production schedule, as shown in Equations (5) and (6):

$$\frac{\text{Total Hours}}{\text{Year}} = \frac{\text{Shifts}}{\text{Day}} \times \frac{\text{Hours}}{\text{Shift}} \times \frac{\text{Workdays}}{\text{Year}} \quad (5)$$

$$\frac{\text{Total Machine Hours Required}}{\text{Year}} = \quad (6)$$

$$\frac{\text{Total Cycle Time at Station}}{\text{Part}} \times \frac{\text{Parts}}{\text{Year}}$$

Combining Equations (5) and (6) yields the expression for the minimum number of stations required $$\text{Min Stations Required} = \quad (7)$$

$$1 + \text{integer} \left[ \frac{\text{Total Machine Parts Required/Year}}{\text{Total Hours/Year}} \right]$$

Therefore, if there are 4000 labor hours in a year and 5000 machine hours are required at Station X to complete the expected orders for that year, a second machine station must be incorporated. All equipment that is required to meet the expected needs of a given program year is purchased at the beginning of that year and is depreciated for the remainder of the program.

Transfer time of work in progress from station to station in the factory was considered as well. Transfer time was nominally set at 15 minutes per transfer, with several exceptions. For example, a station with automated transfer (e.g. layup robot which removes parts from cutter) or a station virtually connected to another station (e.g. a forming press that was linked indirectly to a preheating oven) would have a shorter transfer time, and any transfer to the autoclave would take longer due to the fact that autoclaves are typically located at an end of a facility or in a separate building.

Total cycle times at each station included several components, summarized in Equation (8):

$$\text{Total Cycle Time} = \text{Part Cycle Time} + \quad (8)$$
$$\text{Recurring Setup Time} + \text{Nonrecurring Setup Time}$$

Part cycle time was the time spent actually working on the part, which was based on the actual productivity measure for the human or machinery at each station. These are summarized in Tables 5 and 6. Total cycle time also includes recurring and non-recurring setup times for the individual stations. A non-recurring setup time is one that would only occur once for a given run of a discrete part (e.g. a change in tooling) and is therefore charged as a fixed cost which is spread over all parts of the particular run. A recurring setup time, such as loading or unloading a machine or cleaning a tool, is added to the cycle time for any part through the station at any time.

Total cycle time was used to calculate direct labor hours and subsequently, the Cost of Labor and Cost of Labor Overhead components of Equation (2). As was mentioned earlier, several other labor cost components were identified as separate items. They include the cost of programming equipment, the cost of supervision on the factory floor, and in-process quality inspection.

Programming labor cost was treated as a fixed cost per discrete part, a percentage of which was absorbed in each part made of that type. Programming times are listed in Table 5. An engineering skill level was required for programming. One supervisor was required for every 18 workers to oversee laborers on the factory floor. To account for the in-process inspection, Q/A inspectors were incorporated into the hand layup and bagging stations. An inspector was present during the layup and bagging operation 25% of the time, checking ply orientations and accuracy tolerances on the layup work in progress or checking vacuum seals for leaks, with one exception: in the case of 3D layup of 12 inch tape the inspector was required 50% of the time.

Figure 6:
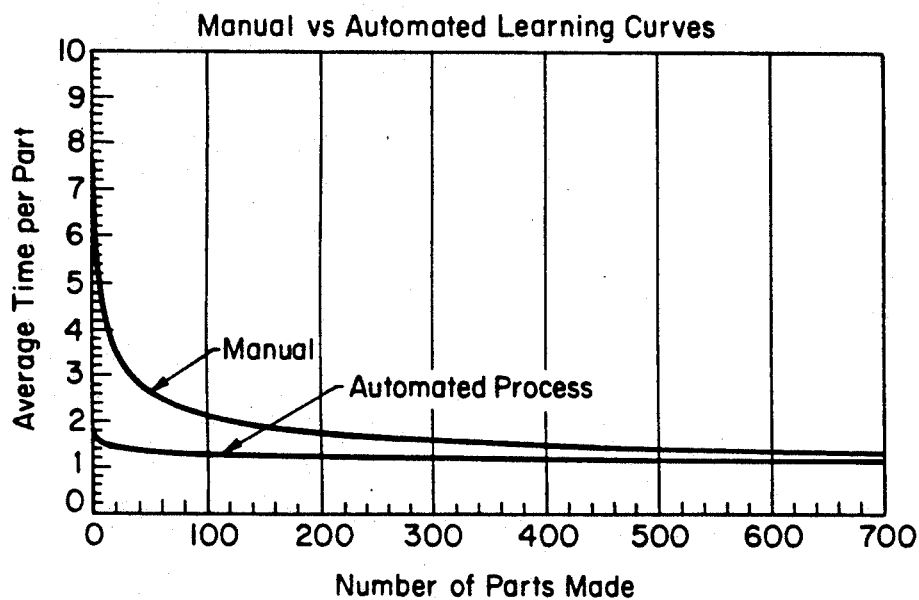
FIG. 6 is an illustration comparing the manual and automated learning curves.

Direct labor hours and material scrap rates were adjusted to include learning curve effects. The learning curve is a standard way to account for increases in worker skill and efficiency over time. As a brief example, learning curve effects can be seen in the following phenomena which occur over time as production increases:

—reduction of worker cycle times
—an increase in overall process efficiency
* reduced scrap rates
* decrease in transfer time from station to station in a factory The rate an amount of skill increase depends on the task the worker is performing. A fully manual task increases a greater amount at a faster rate than an automated one, as shown in FIG. 6. This is due to the fact that less "learning" occurs when a machine is involved Machine "learning" is a phenomenon which reflects optimization of control programs generated by humans and in human improvement in setup, loading and unloading of the machine.

Figure 7:
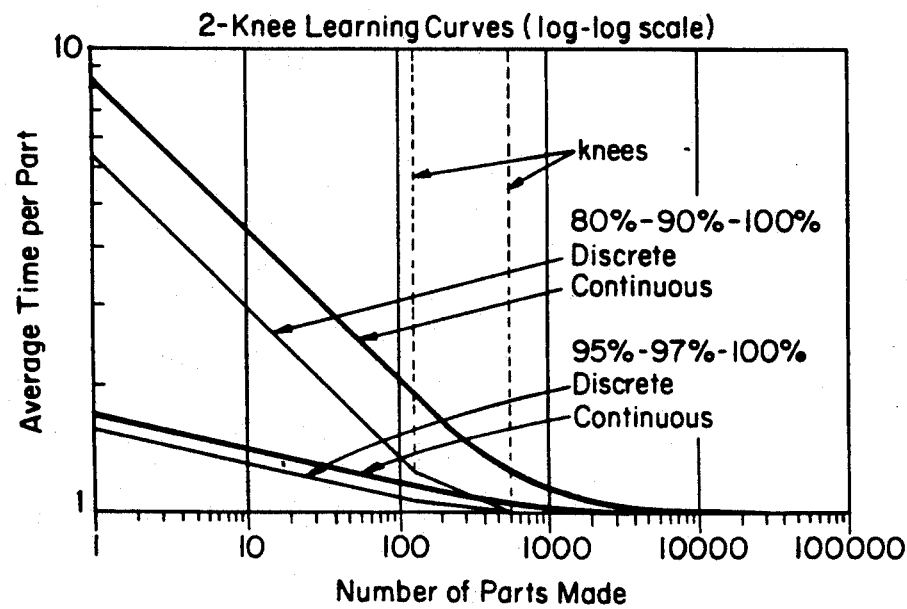
FIG. 7 is a graphical log-log scale illustration of two-knee learning curve used in the system according to this invention.

A continuous "two-kneed" learning curve, FIG. 7, illustrates learning curve effects The first knee occurs at full rate production, the point at which maximum learning on a new project or task has occurred. This occurs in the aerospace industry somewhere between 120 units and 200 or 250 units. Between the first knee and the second knee, increases in learning will theoretically occur only through process optimization, and not through discrete human beings learning to perform their jobs better The second knee occurs when learning curve effects level off. This is to provide realism in the illustration; without the second knee the average cycle time per part would approach zero as the number of parts produced continued to increase. Estimates on where the second knee occur range from 500 units to 1200 units. In this study, knees were placed at 120 units and 500 units. These numbers were chosen because they are conservative from a machine designer's point of view in the sense that they make human labor appear in its best light relative to industry data. It was assumed that learning in manual processes increased at a rate of 80% until the first knee, then at 90% until the second knee, where learning levels off. Automated processes increase at 95% and then go to 97% after the first knee.

When cost analysis program 10 is used to evaluate the fabrication costs involved in manufacturing a thermoplastic skin 50 of simple curvature, FIG. 4, a large number of process paths are considered, FIG. 5. The result of any given run of the program 10 is a listing of the various components of the total part cost summarized in Equation (2) for all of the process paths considered. By varying input data, the user can generate cost breakdowns which simulate a wide variety of situations: the sensitivity of part cost to part size, unique part count, production ramp up rate, burden rate and other factors are considered. The high and low volume baseline parameters described below in Table 11 are used unless otherwise noted.

TABLE 11

| Baseline Parameters for Cost Study | | | |
|---|---|---|---|
| Parameter | | Value | (Units) |
| Program length | | 7 | years |
| Unique Parts/Shipset | | 10 | |
| Shipsets/Year | "low volume" | 10 | |
| | "high volume" | 100 | |
| Total Parts/Program | "low volume" | 700 | |
| | "high volume" | 7000 | |
| Part Dimensions | length | 2 | feet |
| | width | 3 | feet |
| | thickness | 16 | plies |
| Overhead Rate (see Table 3) | | 70 | % |
| Benefits | | 40 | % |
| Layup | | 2D | |
| Cutting | | Manual | |

Figure 8:
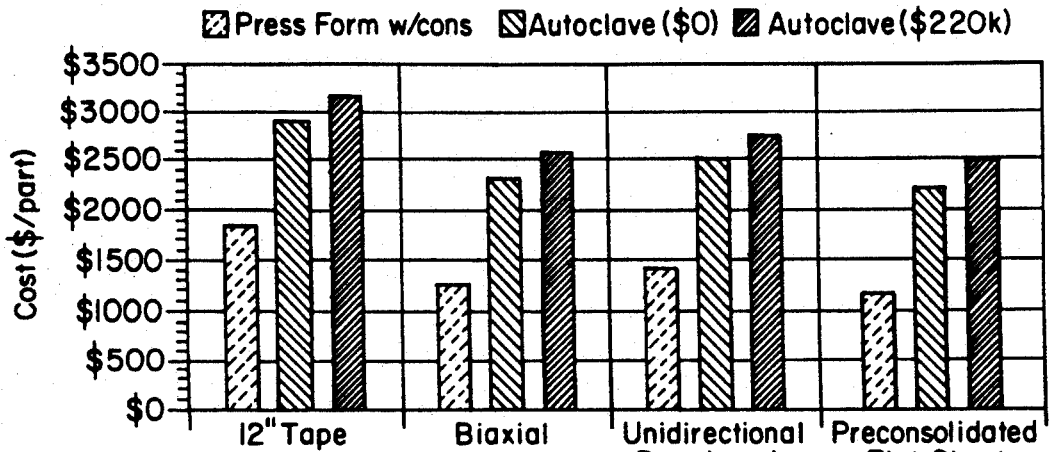
FIG. 8 is a bar graph showing the effect of autoclave expense on unit part cost.

The final step for all of the processing paths represented by FIG. 5 is either autoclave consolidation or press forming with consolidation. First, considering these alternative consolidation techniques from a cost standpoint, FIG. 8, compares the total part cost at the low volume production rate for autoclave consolidation and press forming with consolidation.

It is clear that a significant cost penalty is incurred when using an autoclave for consolidation. The cost increase is approximately $1300/part, independent of the material type. The resultant percentage increase varies from 72% for 12 inch tape to 114% for the preconsolidated flat sheet. There are situations where the equipment costs for an autoclave may not be an issue; for example, a company may already have a fully depreciated autoclave from theromset manufacturing operations. Under the assumption that a "no-cost" autoclave is used, the cost penalty for using the autoclave is still $1100/part. This indicates that equipment purchase cost is a small percentage of the overall costs associated with autoclave operation.

Figure 9:
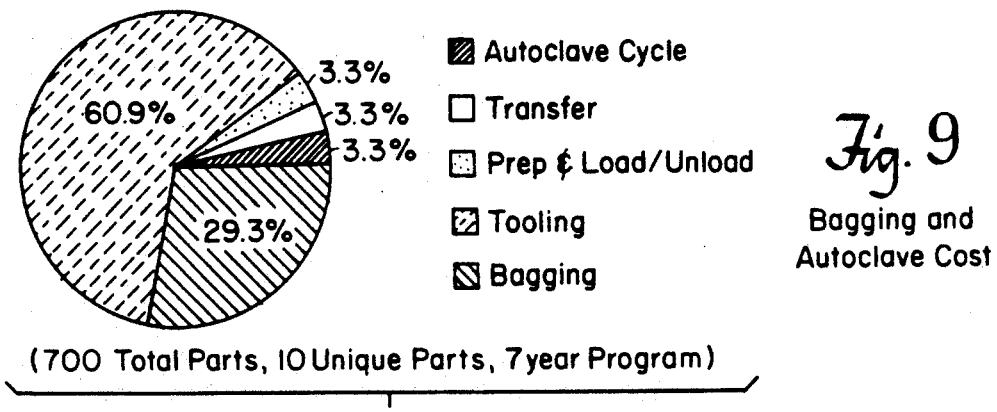
FIG. 9 is a pie chart illustrating bagging and autoclave costs.
Figure 10:
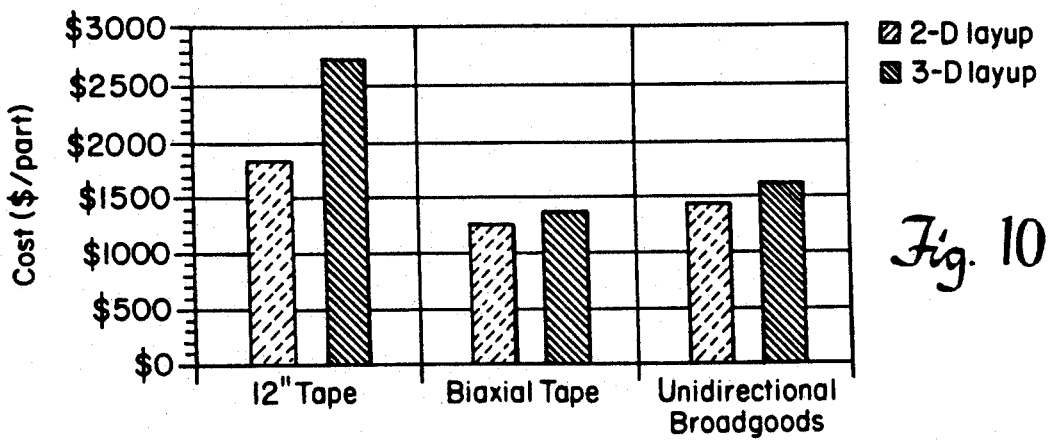
FIG. 10 is a bar graph illustrating the effect of two-dimensional and three-dimensional layups on unit part cost.

FIG. 9 is a breakdown of all other costs incurred during the bagging and autoclave process. Tooling contributes approximately $600/part or 61% to overall autoclave costs. The high tool cost is a result of using a graphite tool in autoclave operations. It is assumed that graphite tooling was a necessary result of using a graphite tool in autoclave operations. It is assumed that graphite tooling was necessary since Coefficient of Thermal Expansion (CTE) is a concern when a part must be temperature cycled on a tool. Lower cost tooling materials such as steel and electroformed nickel were also evaluated Even with these low cost tools, the total cost of the autoclave process was still higher than the cost of the press forming process. In a large part, this was due to the cost of bagging ($285/part). This indicates that press forming with consolidation should be employed whenever the desired part geometry can be achieved through pressing Consider next the actual forming operation. In preparation for forming, a part can be laid up in the flat or laid directly on the tooling in near net shape. It is reasonable to assume that the three-dimensional layup rate will be some percentage slower than the two-dimensional rate, since extra care is required to assure accurate fiber placement on a contoured surface. FIG. 10 illustrates this effect; here it was assumed that three-dimensional layup took 33% longer than two-dimensional layup. The cost difference between two-dimensional and three-dimensional layups are accentuated with materials in tape form, which require more layup labor than broad goods.

The conclusion is that for the simple curvature skin, the part should be laid up in two-dimensional and formed int net shape It is important to note that for more complex geometries, three-dimensional layup may be a necessity. Since three-dimensional layup is more expensive, it should only be used if the desired part geometry cannot be achieved with two-dimensional layup and press forming.

Figure 11:
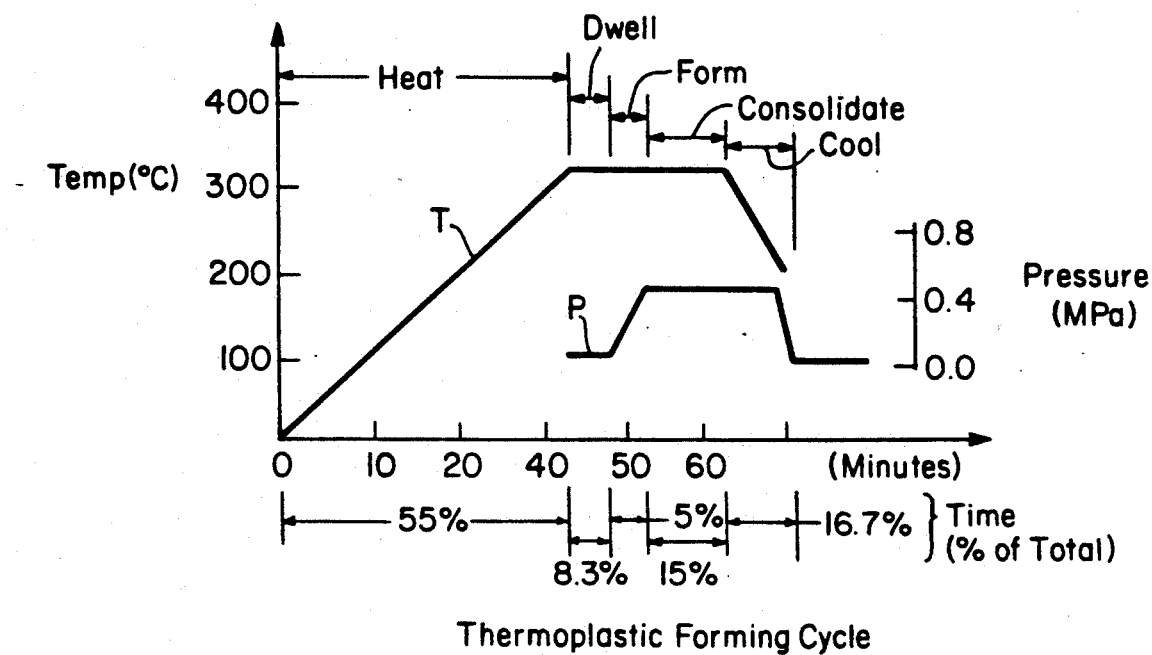
FIG. 11 is a graphic illustration of the temperature versus time characteristic for a thermoplastic forming cycle.

Another advantage of three-dimensional layup is the possibility of reduced forming times. FIG. 11 shows empirical data of temperatures and pressure cycles versus time during the forming of a thermoplastic part. In this case, since forming time is only about 5% of the total cycle time, no significant advantage can be gained from forming three-dimensional laminates as opposed to two-dimensional laminates. In this example, it is thermal inertia (i.e. heating up the oven and laminate that sets the limits on overall forming cycle time.

Figure 12:
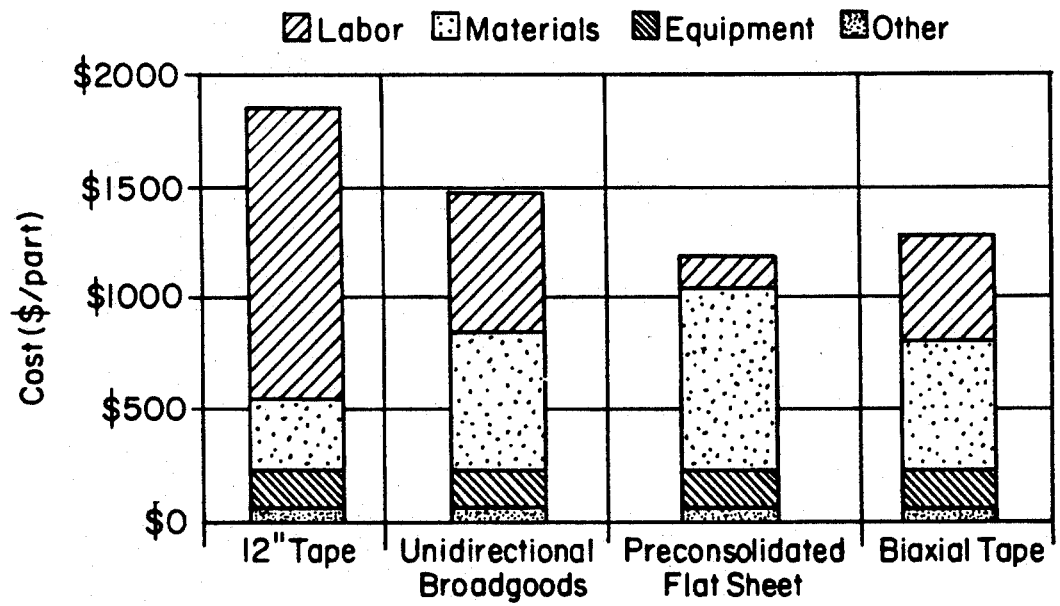
FIG. 12 is a bar graph illustrating the total cost and cost mix for baseline processes.

For non-automated processes, four basic types of material were considered: 12" unidirectional tape, biaxial broadgoods, unidirectional broadgoods and the preconsolidated flat sheet. The combination of laying up in two-dimensional (as opposed to three-dimensional) and press forming with consolidation (as opposed to autoclaving) is the most economical way to make the thermoplastic skin. This process path will therefore be used in the material comparison. The total cost and cost mix for parts made from each material is shown in FIG. 12.

Equipment and other costs are equivalent in all cases since the same processing path was used. Therefore it is the mix between material and labor costs which determines the total part costs in FIG. 12. This example clearly illustrates how paying different amounts for a raw material can affect downstream manufacturing costs. Although 12-inch tape is the lowest-cost raw material, the high labor content at the 12-inch tape layup station makes this the most costly process overall at $1834/part. All three of the other materials are in broadgoods form, and since broadgood are easier to layup, processing labor is reduced. The least labor intensive of all processing paths uses the preconsolidated flat sheet, which eliminates layup labor all together. Even though the preconsolidated flat sheet is the most expensive raw material, the reduced labor requirement results in the lowest total cost part ($1167). The biaxial material is the lowest cost broadgoods material and results in a part cost of $1247, slightly higher than the preconsolidated flat sheet. Unidirectional broadgoods has a raw material cost approximately equal to the biaxial material. Since it is not interlaced, it requires twice the layup time of the biaxial material (see Table 6).

It is evident that labor expense contributes significantly to total part cost when low-cost materials such as twelve-inch tape are used. If automation techniques can be developed to reduce labor content then it is possible that low cost materials can become cost effective. The potential cost saving which can be achieved through implementation of labor-saving automation can be evaluated by considering only the non-labor expenses of a process. By ignoring the labor portion of each cost bar in FIG. 12, it can be seen that twelve-inch tape has the lowest non-labor cost content and consequently stands to benefit mos from labor-reducing automation. The preconsolidated flat sheet with little labor content stands to benefit much less from this type of automation. If cost-effective automation were available which allowed a part manufacturer to work with lower cost materials, the manufacturer could add value to the material in-house instead of paying a material supplier fee plus profit to do it for him. And added advantage of working with materials nearer their raw state is that the part manufacturer gains greater control of final part quality and has more flexibility in tailoring the final properties of the part.

In order to target the labor-reducing automation effort, labor content must first be studied. FIG. 13 shows the labor split for cutting, layup and press forming for each material. Buildup labor comprises the largest portion of the labor content for all materials other than the preconsolidated sheet, where all labor is in press forming. The labor percentage attributed to buildup varies from 52% for the biaxial material to 77% for twelve-inch tape. Total labor hours for the buildup process is made up of actual layup, part transfer, recurring and non-recurring setup, quality control and supervision. FIG. 14 shows how buildup is divided among each of these components. An automated layup system has the potential to reduce direct layup labor significantly. Assuming that supervision and quality inspection costs can be reduced through the application of layup automation as well, automation can affect a total of 70% of all buildup labor for the biaxial material, up to 92% for twelve-inch tape. This indicates that automation of actual layup has strong potential for cost reduction for all of the materials being studied except the preconsolidated flat sheet.

Although not as potentially significant as buildup labor reduction, labor cuts can also be achieved by automating cutting and press forming. Automated cutters do exist, but little or no automation is available for the press forming process. FIG. 15 illustrates the cost centers in the press forming operation. Tooling, forming and setup labor are the major cost components. Tooling, at 24% of total cost, has always been a significant contributor to total costs, especially when many unique parts are required. When production volumes are high, tool costs can be reduced by increasing tool life. When production volumes are low, a flexible tool that is easily reconfigurable to new geometries would greatly reduce costs. Mold cleaning and setup would be a good candidate task for automation. Based on the conclusions in FIG. 15, which suggest that mold preparation and setup comprise 37% of all press forming costs (regardless of what material is used), these operations could potentially be the next best automation target after layup.

Figure 17B:
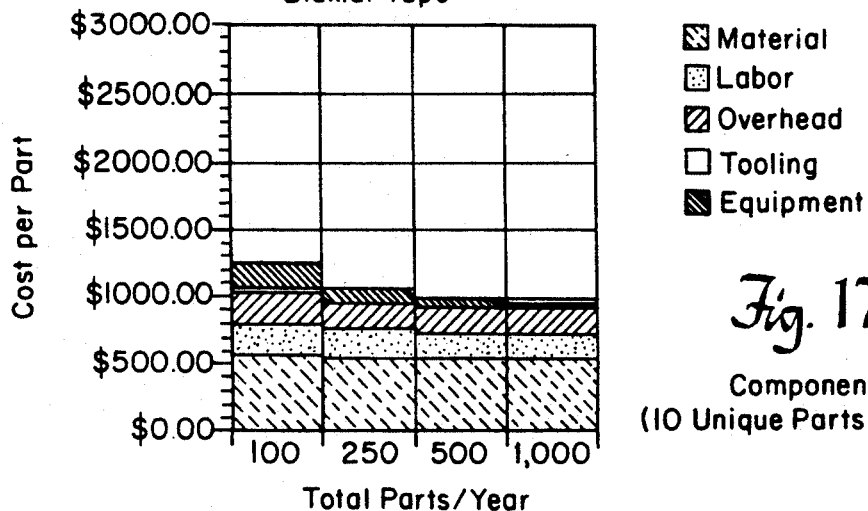

Thermoplastic tapelayers are available, and are making parts in a factory environment They are currently capable of achieving 80% and therefore require a subsequent consolidation operation. Since press forming is the most cost effective consolidation operation, this will be used for the tapelayer analysis. FIG. 16 shows total cost versus part volume for an automated tapelayer and the four baseline processes discussed above. The shape of the cost curves for the baseline processes are all dominated by learning curve effects. Consequently the relative cost differences between each of these materials remains fairly constant as volume increases. The shape of the tapelayer cost curve is not dominated by the learning curve but rather by equipment costs which are being amortized over total part volume. As a result, the tapelayer becomes cost effective for volumes over 2800 parts (7700 lbs) per year. The components which drive the shape of the curve are better illustrated by looking at the change in cost mix as production volume changes. FIG. 17A shows a dramatic change in the cost as production volume increases for a part made with a tapelayer. The cost decrease as volume increases is mainly attributable to a large drop in equipment cost on a per part basis. FIG. 17B shows the cost mix at the same volumes for biaxial broadgoods. Here, since equipment cost is a much smaller percentage of total costs, total cost is less sensitive to volume changes.

Figure 18B:
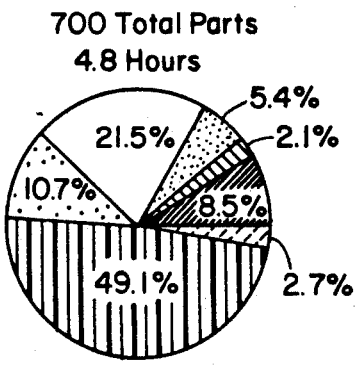

Tapelayer programming labor costs are also sensitive to part volume. Since the programming time for each unique part is spread out over all parts made of that type, increased part volume reduces the per part programming costs. As total volume increases from 700 to 7000 total parts, the portion of labor attributable to programming drops off from 49% to 9.1%, FIG. 18. For this same volume increase, since programming costs are distributed over a greater number of parts, total labor cost per unit drops by 40%. This example illustrates the importance of an efficient and user friendly programming system, especially for high unique part count or low volume.

Since cutting comprises a small percentage of overall part cost, FIG. 13, the cost impact of automated cutting is moderate Reciprocating knife and ultrasonic cutters, which cut two to eight times faster than human operators, have long been used with thermosets and can also be applied to thermoplastics. However, for the part considered in this study, very little cutting is actually needed. At the human and machine cutting rates listed in Tables 5 and 6, an entire part can be cut in about 1.5 minutes by the automated cutter and twelve minutes by a human. Most of the cost of cutting is in spreading the material, removing scrap, and kitting the cut part The amount of labor saved by using automated cutters roughly offsets the capital invested in the equipment, FIG. 19. FIG. 19 illustrates that the difference in cost between processes using automated and manual cutting is minimal, especially at higher volumes.

A change in layup rates can have an effect on the tapelayer break-even point. Increasing the unidirectional layup rate by 33% and the broadgoods layup rates by 210%, Table 6, yields the total cost curve of FIG. 22. First, the increase in the layup ratio has raised the tapelayer break-even point from 2800 to 3500 total parts. Second, biaxial broadgoods are now the most cost-effective baseline material. This resulted from raising the broadgoods layup rate which reduced labor costs for the biaxial material but not for the preconsolidated sheet process. These results indicate that layup rate can affect process break-even points.

The effect of part size on total cost is shown in FIG. 23. As the part size increases, a corresponding increase in unit part cost occurs. Part size increases have the greatest effect on material costs and layup time. As part size is increased from 16 plies to 128, material cost and layup labor increase by a factor of eight. As a result, the processes which have a relatively high combination of material and layup costs, such as twelve-inch tape, are most sensitive to changes in part size. On the other hand, processes such as the automated tapelayer process (which uses the lowest cost material and has the least amount of layup cost) are much less sensitive to part size changes. This indicates that automated systems that reduce labor and utilize low cost raw materials are desirable when part size varies a great deal since they are least sensitive to variances in this parameter. See Table 12.

TABLE 12

Material and Layup Cost Comparison

| Material/process | Material Cost | Layup Labor Cost | Material + Layup |
|---|---|---|---|
| 12" tape | $346 | $876 | $1222 |
| Preconsolidated sheet | $812 | $812 | $812 |
| Biaxial broadgoods | $571 | $155 | $726 |
| Auto Tapelayer 4" tape | $198 | $56 | $254 |

Figure 24C:
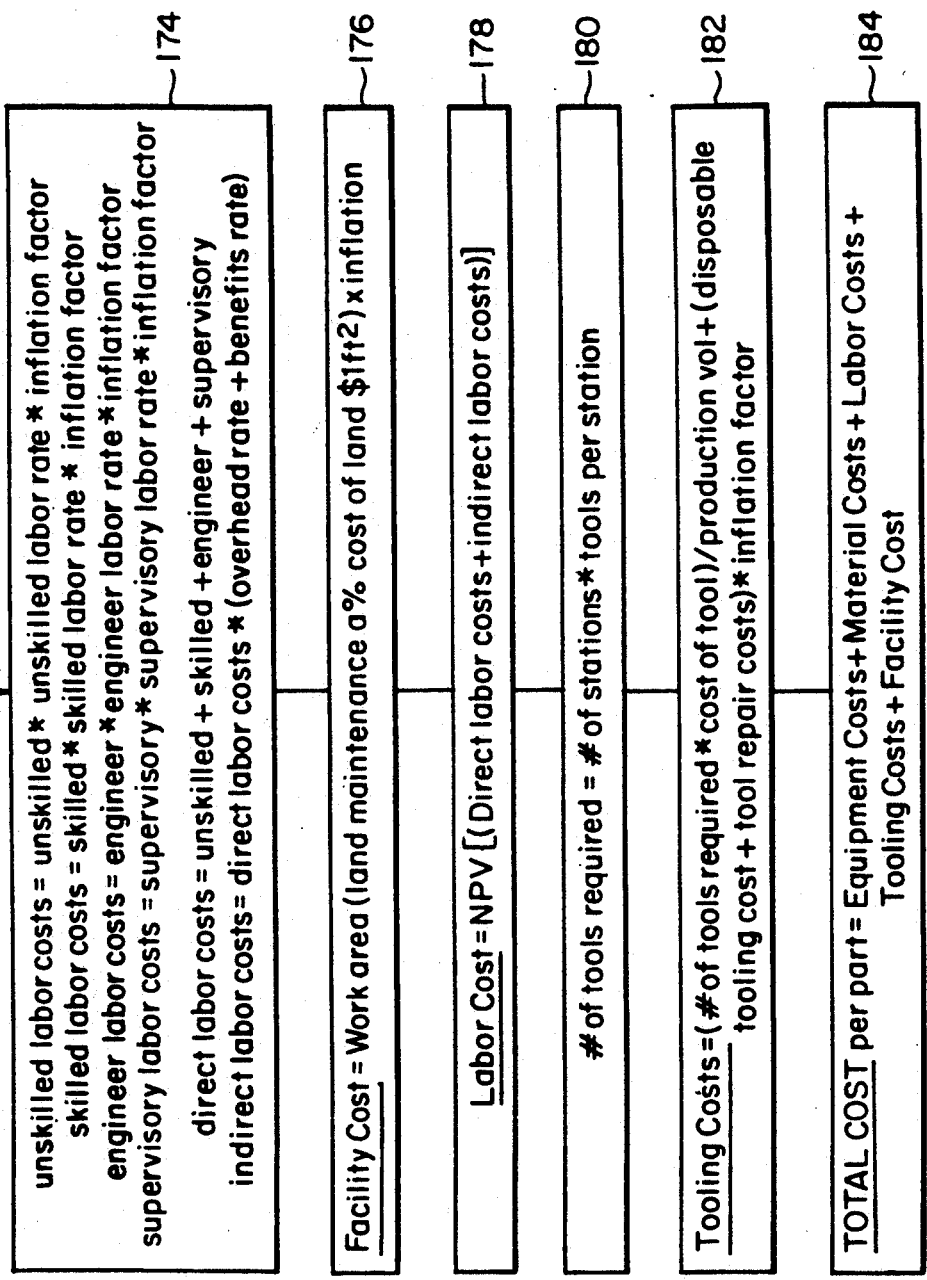

Sensitivity to changes in the number of unique parts can be analyzed as well by varying the number of unique parts while holding part size and the total part count constant. In this case, material costs and layup costs will not vary since the total number of parts and the amount of material used in each part is held constant. Instead, variations in total cost will be used by changes in setup, programming and tooling expenses. The tapelayer is the most sensitive to changes in unique part count, FIG. 24. A unique part count is raised from 10 to 100, total cost increases $1622, most of which is attributable to increased programming labor. The autoclave process, which uses expensive graphite tooling, is also highly sensitive to increased part count. This is especially evident when comparing the slope of this curve with the slope of the press forming curves, which all use steel tooling. This analysis indicates two things. First, as was mentioned earlier, tooling is a major cost factor in fabricating thermoplastic parts The is a need for low cost and/or flexible tooling if the number of unique parts is high. Second, automated equipment can be quite sensitive to changes in unique part count. The issue is one of flexibility. Flexibility comes from hardware and from software. We can see in this example that it is software that limits the automated system's flexibility. This indicates that when new automated equipment is designed, careful thought must go into the development of the programming system to insure that the full cost cutting capabilities of the system can be utilized.

In all analyses conducted to this point it was assumed that the production volume was constant over the life of the program. In actuality, however, many programs will gradually build up volume to a full production rate. A gradual volume ramp-up can reduce total costs by delaying capital expenses to later years in a program. The two production runs listed in Table 13 will be used to analyze the decrease in unit part cost that occurs when a gradual ramp-up rate is used.

TABLE 13

Production Runs Used in Sensitivity to Ramp-Up Rate Analysis

| | Number of Shipsets Per Year | | | | | | | |
|---|---|---|---|---|---|---|---|---|
| | Year 1 | Year 2 | Year 3 | Year 4 | Year 5 | Year 6 | Year 7 | Total |
| Constant Rate | 28 | 28 | 28 | 28 | 28 | 28 | 28 | 196 |
| Gradual Buildup | 4 | 5 | 8 | 12 | 24 | 60 | 84 | 196 |

TABLE 14

Decrease in Unit Part Cost for Gradual Production Volume Ramp-up

| | % Decrease in Cost | | |
|---|---|---|---|
| Material/process | Material | Labor | Total |
| 12" tape | 20 | 14 | 15 |
| Preconsolidated sheet | 20 | 14 | 18 |
| Biaxial broadgoods | 20 | 14 | 17 |
| Auto Tapelayer 4" tape | 20 | 14 | 10 |

When switching from the constant to the ramp-up production schedule shown in Table 14, a 20% reduction in material cost occurs. This reduction in cost results from delaying the purchase of material to later years in the program. Since all future purchases are adjusted to account for the time value of money and much of the material is purchased in the final years, a net savings of 20% occurs. In the case of labor costs, in addition to taking into account the time value of labor expenses, labor rates were adjusted for inflation. For this reason, going to the ramp-up schedule only reduced labor costs by 14%. The total effect of the savings generated through purchasing labor and material in the future depends on the ratio of materials cost to labor cost in the process Total decrease in unit cost as a result of gradual volume ramp is shown in Table 15 for the four processes analyzed.

Different cost accounting techniques account for overhead costs in different ways. In the traditional scheme, all indirect costs are lumped together into an overhead burden rate that is charged against an application base such as labor. It is important to understand the effect that this accounting technique can have on break-even analysis which may be used to make a go/no go buy decision for automated equipment. FIG. 23 shows total cost for the baseline processes and the automated tapelayer based on traditional accounting procedures.

Direct labor was selected as the overhead application base and a $65 wrap rate was assumed, Table 3.

What is immediately noticeable is that all cost curves have taken on the characteristic shape of the labor learning curve. The shape of equipment intensive processes can no longer be distinguished from the shape of processes which are labor intensive. When indirect costs such as equipment were identified separately the shape of the tapelayer cost curve was dominated by the amortized equipment cost, FIG. 15. As a result a clean break-even point could be found above which the tapelayer is the most cost effective processing choice. Using traditional accounting practice the tapelayer is economical regardless of production volume.

To account for the purchase of a $1.8 million piece of equipment, the burden rate could be adjusted. However, burden rate adjustments would only shift the cost curve up or down without modifying its characteristic shape. As a result, the true cost characteristics of various processing options are not revealed. This analysis indicates that traditional accounting methods which lump indirect costs into an overhead rate can lead to incorrect decisions when trying to justify new equipment expenditures Traditional techniques should be replaced with methods that isolate cost centers and allocate costs appropriately. Improved methods such as these can then serve as better guidelines for future expenditures as well as research efforts into automated system development.

At each step 24–36, FIG. 2, in accordance with the novel approach of this invention, a cost estimation is done which takes into consideration the unbundled elements of the cost including labor including indirect and direct labor and learning curve effects, tooling costs, material costs, equipment costs, and the like. At each step a complete workup is done by the system 10 using process knowledge module 14, process path generator module 20, process cost account module 18, and the input database 12, as shown in the flow chart of FIGS. 24A, B and C. Initially, in step 150 the part geometry including length, width, ply, thickness, number of plies, part volume, surface area, perimeter, are called from the database. Then the number of production years is called in step 152 and the cycle time is computed in step 154. The cycle time is equal to the transfer time plus recurring setup time plus nonrecurring setup time divided by the production volume plus the process rate divided by the process yield. After this the cycle time is adjusted for productivity loss in step 156 and then the learning curve calculations are computed in step 158 using the equations and parameters shown. The total cycle time is then computed in step 160 from the adjusted cycle time and the learning curve effect coefficient developed in step 158. After this the labor hours are calculated, including both the touch such as unskilled and skilled labor, and the non-touch, such as engineer and supervisory labor, in step 162. The number of stations is then calculated in step 164 by multiplying the INT times the adjusted cycle time divided by work hours per year multiplied by the production volume plus 1. In step 166, the maintenance cost is calculated by multiplying initial cost times maintenance cost percent, depreciation costs are calculated by multiplying initial cost times one minus the total number of years times the useful life, all of which is divided by the total number of years. Finally, the power cost is determined from the cycle time multiplied by the power required times the electricity cost times an inflation factor.

In step 168, the equipment costs are calculated as shown followed by the calculation in step 170 of the material used and the adjusted cumulative scrap factor. Material costs are determined in step 172 for the material used, the adjusted cumulative scrap factor and raw material costs. The elemental labor costs are calculated in step 174, the facilities costs in step 176, and the full labor costs in step 178. The costs of the number of tools required is calculated in step 180 from the number of stations multiplied by the number of tools per station, and the tooling costs are calculated in step 182 from the number of tools required and the cost of tools in conjunction with the production volume, disposable tooling costs, tool repair costs and inflation factors. Finally, the total cost per part is calculated in step 184 from the equipment costs, material costs, labor costs, tooling costs and the facility costs. Thus the specific elements of these costs in step 184 are calculated for each step in the process so that there are no hidden or bundled overhead burdens which will distort the true costs of a part or a particular operation in the making of a part.

An automated manufacturing cost analyzing system for finding the best path through the processing tree 14, FIG. 5, begins with defining each node consisting of an operation, its input and output states in step 200, FIG. 25. Then the determination is made of the initial states and the final operation states in step 202. The tree logic algorithm is then executed in step 204 backwardly through the nodes beginning with the final state and ending with the initial, state. This is done in order to minimize the combinatorial explosion that occurs when more than a few initial states and multiple interconnected paths are possible. Because the program stores partially completed paths as it branches backwards from the final state to the initial state, the total number of steps needed to find all paths in the tree is dramatically reduced since the program does not need to rediscover connections it already found. The execution begins in step 204 with the finding of the next previous node going backward from the final state toward the initial state. Inquiry is then made in step 206 as to whether this node is in a unique path, that is, one that has not been traveled before by the system in this cycle of operation. If the answer is yes, the system goes to that node in step 208 and calls the data for that node in step 210 and calculates the cost for that node and stores it in step 212. Inquiry is then made in step 214 as to whether this present node contains an initial state. If the answer is yes, then the total cost for all the nodes on the path are totalled in step 216, and the system then goes back to the last previous node in step 218 to see if there is another branch to be explored. This cycles the system back to step 204 to find the next previous node. When again the inquiry is made as to whether this node is in a unique path, if the answer is no then in step 220 inquiry is made as to whether there are any other possible paths. If there are, the system cycles back to step 204. If there are not, further inquiry is made as to whether this node contains a final state. If it does, the system simply exits the routine in step 222. If this node does not contain a final state, then in step 224 the system backs up to a node with the same final state and returns to step 204 to find another unexplored branch. In step 214, if in response to the inquiry as to whether the present node contains an initial state the answer is negative, the system recycles back to step 204 to attempt to find the next previous node.

In this manner the system most efficiently steps through all the possible paths and in each path, as indicated with respect to FIG. 2, a cost estimation calculation is made at each step in accordance with the sequence shown in FIGS. 24A, B and C. That is, the sequence of FIGS. 24A, B and C is applied to each step in the sequence shown in FIG. 2, and the routine in FIG. 25 generates a plurality of sequences similar to that in FIG. 2 as indicated by the multiple paths depicted in FIG. 5. Thus not only does this invention provide a system and method for automatically generating reliable cost estimation for automated manufacturing which exposes all the true costs allocated to the proper elements, but it can also automatically analyze the multiplicity of manufacturing paths available by which a part can be fabricated to reveal which is truly the least expensive path.

Although the example herein deals with fabrication of a part made from composite materials, the invention is equally applicable to the manufacture of any part in accordance with the same inventive principles.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An automated manufacturing cost estimating system with indirect cost allocation comprising:
   means for identifying a material in an initial state for manufacturing a product in a final state;
   means for defining a plurality of operations for converting said material from its initial state into the final state of the product, said plurality of operations being interconnected to define a plurality of paths;
   means for calculating a direct labor cost value for each said operation based on direct labor hours and calculating an indirect cost value specifically allocated for each said operation based on consumption of overhead cost elements by the operation; and
   means for summing costs calculated for each operation and each path to determine the total cost of manufacture of a part.

2. The system of claim 1 in which said means for calculating includes means for computing the cost of materials used in each said operation to obtain the total cost of converting the material from its said initial state to the final state.

3. The system of claim 1 in which said means for calculating includes means for computing the cost of equipment used in each said operation.

4. The system of claim 1 in which said means for calculating includes means for computing the cost of tooling used in each said operation.

5. The system of claim 1 in which said means for calculating includes means for computing the cost of facilities used in each said operation.

6. The system of claim 1 in which said means for calculating the direct labor cost value includes means for adjusting labor costs to accommodate learning curve effects.

7. The system of claim 3 in which said means for computing the cost of equipment includes means for amortizing the cost of equipment.

8. The system of claim 1 in which said means for calculating the direct labor costs includes means for determining both direct and identifiable indirect labor costs.

9. An automated manufacturing cost estimating method with indirect cost allocation comprising:
   identifying a material in an initial state for manufacturing a product in a final state;
   defining a plurality of operations for converting said material from its initial state into the final state of the product, said plurality of operations being interconnected to define a plurality of paths;
   calculating a direct labor cost value for each said operation based on direct labor hours and calculating an indirect cost value specifically allocated for each said operation based on consumption of overhead elements by the operation; and
   summing the costs allocated for each operation and each path to determine the total cost of manufacture of a part.

10. The method of claim 9 in which calculating, includes computing the cost of materials used in each said operation to obtain the total cost of converting the material from its said initial state to the final state.

11. The method of claim 9 in which calculating, includes computing the cost of equipment used in each said operation.

12. The method of claim 9 in which calculating, includes computing the cost of tooling used in each said operation.

13. The method of claim 9 in which calculating includes computing the cost of facilities used in each said operation.

14. The method of claim 9 in which calculating the direct labor costs includes adjusting labor costs to accommodate learning curve effects.

15. The method of claim 11 in which computing the cost of equipment includes amortizing the cost of equipment.

16. The method of claim 9 in which calculating the direct labor costs includes determining both direct and identifiable indirect labor costs.

17. An automated manufacturing cost analysis system comprising:
   means for identifying a plurality of different materials in an initial state for manufacturing a product in a final state;
   means for defining a number of interconnected manufacturing operations for converting each of said different materials from its said initial state into the final state of the products;
   means for generating a plurality of paths through said interconnected manufacturing operations between said different materials in the initial state and said product in the final state;
   means for determining a predetermined cost parameter associated with each operation; and
   means for accumulating the determined cost parameters along each said path.

18. The automated manufacturing cost analysis system of claim 17 in which said means for defining each operation includes means for associating each operation with an input state and an output state to define a node.

19. The automated manufacturing cost analysis system of claim 18 in which said means for generating includes means for executing a logic tree algorithm through said nodes.

20. The automated manufacturing cost analysis system of claim 17 in which said means for determining a predetermined cost parameter includes means for calculating direct labor costs for each said operation based on direct labor hours and calculating indirect costs specifically allocated for each said operation based on consumption of overhead cost elements by the operation.

21. The automated manufacturing cost analysis system of claim 19 in which said means for executing executes through said nodes from the final state to an initial state.

22. The automated manufacturing cost analysis system of claim 21 in which said means for executing includes means for finding the next previous node, means for ascertaining whether said next previous node is in a unique path that has not been traveled before by the system in a present execution cycle, means for retrieving data associated with that node if that node is in a unique path and calculating costs for that node, and means for summing the costs for all the nodes in a path when an initial node is obtained.

23. The automated manufacturing cost analysis system of claim 22 in which said means for executing further includes means, responsive to a present node not being in a unique path, for finding another next previous node if there are any other possible unique paths.

24. The automated manufacturing cost analysis system of claim 23 in which said means for executing further includes means, responsive to the present node being in a unique path, for determining whether said present node contains the final state.

25. The automated manufacturing cost analysis system of claim 24 in which said means for executing further includes means, responsive to a present node not containing a final state to back up to a nonprior node with the same final state to find another unexplored branch.

26. An automated manufacturing cost analysis method comprising:
   identifying a plurality of different materials in an initial state for manufacturing a product in a final state;
   defining a number of interconnected manufacturing operations for converting each of said different materials from its said initial state into the final state of the product;
   generating a plurality of paths through said interconnected manufacturing operations between said different materials in the initial state and said product in the final state;
   determining a predetermined cost parameter associated with each operation; and
   accumulating the determined cost parameters along each said path.

27. The automated manufacturing cost analysis method of claim 26 in which defining each operation includes associating each operation with an input state and an output state to define a node.

28. The automated manufacturing cost analysis method of claim 27 in which generating includes executing a logic tree algorithm through said nodes.

29. The automated manufacturing cost analysis method of claim 26 in which determining a predetermined cost parameter includes calculating direct labor costs for each said operation based on direct labor hours and calculating indirect costs specifically allocated for each said operation based on consumption of overhead cost elements by the operation.

30. The automated manufacturing cost analysis method of claim 28 in which executing includes advancing through said nodes from the final state to an initial state.

31. The automated manufacturing cost analysis method of claim 30 in which executing includes finding the next previous node, ascertaining whether said next previous node is in a unique path that has not been traveled before by the system in a present execution cycle, retrieving data associated with that node if that node is in a unique path and calculating costs for that node, and for summing the costs for all the nodes in a path when an initial node is obtained.

32. The automated manufacturing cost analysis method of claim 31 in which executing further includes, when a present node is not in a unique path, finding another next previous node if there are any other possible unique paths.

33. The automated manufacturing cost analysis method of claim 32 in which executing further includes, when said present ode is in a unique path, determining whether said present node contains the final state.

34. The automated manufacturing cost analysis method of claim 33 in which executing further includes, when a present node does not contain a final state, backing up to a nonprior node with the same final state to find another unexplored branch.

* * * * *